United States Patent
Zeng et al.

(10) Patent No.: US 10,196,269 B1
(45) Date of Patent: Feb. 5, 2019

(54) MANUFACTURING OF MACROSCOPIC NANOMATERIALS USING FLUID UNDER ELEVATED TEMPERATURE AND PRESSURE

(71) Applicant: The Florida State University Research Foundation, Inc., Tallahassee, FL (US)

(72) Inventors: Changchun Zeng, Tallahassee, FL (US); Zhiyong Liang, Tallahassee, FL (US); Yan Li, Tallahassee, FL (US); Jin Gyu Park, Tallahassee, FL (US)

(73) Assignee: The Florida State University Research Foundation, Inc., Tallahassee, FL (US)

(*) Notice: Subject to any disclaimer, the term of this patent is extended or adjusted under 35 U.S.C. 154(b) by 0 days.

(21) Appl. No.: 15/173,151

(22) Filed: Jun. 3, 2016

Related U.S. Application Data

(60) Provisional application No. 62/172,071, filed on Jun. 6, 2015, provisional application No. 62/171,744, filed on Jun. 5, 2015.

(51) Int. Cl.
*D01F 9/12* (2006.01)
*C01B 31/02* (2006.01)
(Continued)

(52) U.S. Cl.
CPC .............. *C01B 31/026* (2013.01); *B82Y 30/00* (2013.01); *B82Y 40/00* (2013.01);
(Continued)

(58) Field of Classification Search
CPC . C01B 31/026; C01B 2202/08; C01B 31/022; C01B 31/0226; C01B 31/0233; C01B 31/024; C01B 31/0246; C01B 31/0253; C01B 31/0266; C01B 31/0273; C01B 31/028; C01B 31/0286; C01B 31/0293; C01B 2202/00; C01B 2202/02; C01B 2202/04; C01B 2202/06; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 30/00; B82Y 40/00; B82Y 5/00;
(Continued)

(56) References Cited

U.S. PATENT DOCUMENTS

| | | | |
|---|---|---|---|
| 7,993,620 B2 | 8/2011 | Lashmore et al. | |
| 2008/0170982 A1* | 7/2008 | Zhang | B82Y 10/00 423/447.3 |

OTHER PUBLICATIONS

Ericson, et al., Macroscopic Neat Single-Walled Carbon Nanotube Fibers, Science 2004; 305: 1447-1450.*
(Continued)

*Primary Examiner* — Daniel McCracken
(74) *Attorney, Agent, or Firm* — Molly L. Sauter; Smith & Hopen, P.A.

(57) ABSTRACT

A process is disclosed for removing impurities from a carbon nanotube structure and then orienting the nanotubes within the structure. The process may use environmentally benign materials and minimize damage to the carbon nanotubes. The process may provide a cost-effective way to manufacture nanomaterials based macroscopic parts and components, whose properties approach to those of the individual nanoparticles.

7 Claims, 23 Drawing Sheets

(51) Int. Cl.
  *B82Y 30/00* (2011.01)
  *B82Y 40/00* (2011.01)
(52) U.S. Cl.
  CPC ....... *C01B 2202/08* (2013.01); *Y10S 977/742* (2013.01); *Y10S 977/845* (2013.01)
(58) Field of Classification Search
  CPC ......... B82Y 10/00; B82Y 15/00; B82Y 20/00; B82Y 25/00; B82Y 35/00; B82Y 99/00; Y10S 977/742; Y10S 977/845; D01F 9/10; D01F 9/127; D01F 9/1271; D01F 9/1272; D01F 9/1273; D01F 9/1274; D01F 9/1275; D01F 9/1276; D01F 9/1277; D01F 9/1278
  See application file for complete search history.

(56) References Cited

OTHER PUBLICATIONS

S. Iijima, Helical microtubules of graphitic carbon. Nature 354, 56-58 (1991).
R. H. Baughman, A. A. Zakhidov, W. A. de Heer, Carbon Nanotubes—the Route Toward Applications. Science 297, 787-792 (2002).
D. N. Futaba et al., Shape-engineerable and highly densely packed single-walled carbon nanotubes and their application as supercapacitor electrodes. Nat Mater 5, 987-994 (2006).
M. F. L. De Volder, S. H. Tawfick, R. H. Baughman, A. J. Hart, Carbon Nanotubes: Present and Future Commercial Applications. Science 339, 535-539 (2013).
B. Vigolo et al., Macroscopic Fibers and Ribbons of Oriented Carbon Nanotubes. Science 290, 1331-1334 (2000).
K. Koziol et al., High-Performance Carbon Nanotube Fiber. Science 318, 1892-1895 (2007).
N. Behabtu et al., Strong, Light, Multifunctional Fibers of Carbon Nanotubes with Ultrahigh Conductivity. Science 339, 182-186 (2013).
A. G. Rinzler et al., Large-scale purification of single-wall carbon nanotubes: process, product, and characterization. Appl Phys A 67, 29-37 (1998).
L. Berhan et al., Mechanical properties of nanotube sheets: Alterations in joint morphology and achievable moduli in manufacturable materials. Journal of Applied Physics 95, 4335-4345 (2004).
M. Zhang et al., Strong, Transparent, Multifunctional, Carbon Nanotube Sheets. Science 309, 1215-1219 (2005).
S. Wang, Z. Liang, B. Wang, C. Zhang, High-Strength and Multifunctional Macroscopic Fabric of Single-Walled Carbon Nanotubes. Advanced Materials 19, 1257-1261 (2007).
Q. Cheng et al., High Mechanical Performance Composite Conductor: Multi-Walled Carbon Nanotube Sheet/Bismaleimide Nanocomposites. Advanced Functional Materials 19, 3219-3225 (2009).
J. Y. Oh et al., Easy Preparation of Self-Assembled High-Density Buckypaper with Enhanced Mechanical Properties. Nano Letters 15, 190-197 (2015).
N. Chakrapani, B. Wei, A. Carrillo, P. M. Ajayan, R. S. Kane, Capillarity-driven assembly of two-dimensional cellular carbon nanotube foams. Proceedings of the National Academy of Sciences 101, 4009-4012 (2004).
M. Nabeta, M. Sano, Nanotube Foam Prepared by Gelatin Gel as a Template. Langmuir 21, 1706-1708 (2005).
M. A. Worsley, J. H. Satcher, T. F. Baumann, Synthesis and Characterization of Monolithic Carbon Aerogel Nanocomposites Containing Double-Walled Carbon Nanotubes. Langmuir 24, 9763-9766 (2008).
M. B. Bryning et al., Carbon Nanotube Aerogels. Advanced Materials 19, 661-664 (2007).
W. Song, I. A. Kinloch, A. H. Windle, Nematic Liquid Crystallinity of Multiwall Carbon Nanotubes. Science 302, 1363 (2003).
Jin Gyu Park et al., The high current-carrying capacity of various carbon nanotube-based buckypapers. Nanotechnology 19, 185710 (2008).
B. Xie, Y. Liu, Y. Ding, Q. Zheng, Z. Xu, Mechanics of carbon nanotube networks: microstructural evolution and optimal design. Soft Matter 7, 10039-10047 (2011).
H. G. Chae, S. Kumar, Making Strong Fibers. Science 319, 908-909 (2008).
H. W. Zhu et al., Direct Synthesis of Long Single-Walled Carbon Nanotube Strands. Science 296, 884-886 (2002).
S. Huang, X. Cai, J. Liu, Growth of Millimeter-Long and Horizontally Aligned Single-Walled Carbon Nanotubes on Flat Substrates. Journal of the American Chemical Society 125, 5636-5637 (2003).
G.-Y. Xiang, D. Z. Wang, Z. F. Ren, Aligned millimeter-long carbon nanotube arrays grown on single crystal magnesia. Carbon 44, 969-973 (2006).
C. Zhang et al., Growth of aligned millimeter-long carbon nanotube by chemical vapor deposition. Diamond and Related Materials 17, 1447-1451 (2008).
D. Y. Kim, H. Sugime, K. Hasegawa, T. Osawa, S. Noda, Sub-millimeter-long carbon nanotubes repeatedly grown on and separated from ceramic beads in a single fluidized bed reactor. Carbon 49, 1972-1979 (2011).
Z. Chen, D. Y. Kim, K. Hasegawa, T. Osawa, S. Noda, Over 99.6 wt%-pure, sub-millimeter-long carbon nanotubes realized by fluidized-bed with careful control of the catalyst and carbon feeds. Carbon 80, 339-350 (2014).
T. Tang, A. Jagota, C.-Y. Hui, N. J. Glassmaker, Collapse of single-walled carbon nanotubes. Journal of Applied Physics 97, 074310 (2005).
K. Yan et al., Radial Collapse of Single-Walled Carbon Nanotubes Induced by the Cu2O Surface. The Journal of Physical Chemistry C 113, 3120-3126 (2009).
M. He et al., Precise Determination of the Threshold Diameter for a Single-Walled Carbon Nanotube to Collapse. ACS Nano 8, 9657-9663 (2014).
L. Lu, W. W Chen, Large-Scale Aligned Carbon Nanotubes from Their Purified, Highly Concentrated Suspension. ACS Nano 4, 1042-1048 (2010).
Y. Lin, J.-W.Kim, J. W Connell, M. Lebrón-Colón, E. J. Siochi, Purification of Carbon Nanotube Sheets. Advanced Engineering Materials 17, 674-688 (2015).
M. N. Tchoul, W. T. Ford, G. Lolli, D. E. Resasco, S. Arepalli, Effect of Mild Nitric Acid Oxidation on Dispersability, Size, and Structure of Single-Walled Carbon Nanotubes. Chemistry of Materials 19, 5765-5772 (2007).
Y. Feng et al., Room Temperature Purification of Few-Walled Carbon Nanotubes with High Yield. ACS Nano 2, 1634-1638 (2008).
H. Liu et al., Self-Assembly of Large-Scale Micropatterns on Aligned Carbon Nanotube Films. Angewandte Chemie International Edition 43, 1146-1149 (2004).
L. Zhang, G. Zhang, C. Liu, S. Fan, High-Density Carbon Nanotube Buckypapers with Superior Transport and Mechanical Properties. Nano Letters 12, 4848-4852 (2012).
D. Wang et al., Highly oriented carbon nanotube papers made of aligned carbon nanotubes. Nanotechnology 19, 075609 (2008).
P. D. Bradford et al., A novel approach to fabricate high volume fraction nanocomposites with long aligned carbon nanotubes. Composites Science and Technology 70, 1980-1985 (2010).
L. Zhang et al., Strong and Conductive Dry Carbon Nanotube Films by Microcombing. Small, 31: 3830-3836 (2015).
D. A. Walters et al., In-plane-aligned membranes of carbon nanotubes. Chemical Physics Letters 338, 14-20 (2001).
J. E. Fischer et al., Magnetically aligned single wall carbon nanotube films: Preferred orientation and anisotropic transport properties. Journal of Applied Physics 93, 2157-2163 (2003).
P. Gonnet et al., Thermal conductivity of magnetically aligned carbon nanotube buckypapers and nanocomposites. Current Applied Physics 6, 119-122 (2006).
K. Kordás et al., Magnetic-Field Induced Efficient Alignment of Carbon Nanotubes in Aqueous Solutions. Chemistry of Materials 19, 787-791 (2007).

(56) References Cited

OTHER PUBLICATIONS

Q. Cheng, B. Wang, C. Zhang, Z. Liang, Functionalized Carbon-Nanotube Sheet/Bismaleimide Nanocomposites: Mechanical and Electrical Performance Beyond Carbon-Fiber Composites. Small 6, 763-767 (2010).

R. Downes, S. Wang, D. Haldane, A. Moench, R. Liang, Strain-Induced Alignment Mechanisms of Carbon Nanotube Networks. Advanced Engineering Materials 17, 349-358 (2015).

Q. Liu et al., Highly aligned dense carbon nanotube sheets induced by multiple stretching and pressing. Nanoscale 6, 4338-4344 (2014).

E. W. Wong, P. E. Sheehan, C. M. Lieber, Nanobeam Mechanics: Elasticity, Strength, and Toughness of Nanorods and Nanotubes. Science 277, 1971-1975 (1997).

D. A. Walters et al., Elastic strain of freely suspended single-wall carbon nanotube ropes. Applied Physics Letters 74, 3803-3805 (1999).

M.-F. Yu, B. S. Files, S. Arepalli, R. S. Ruoff, Tensile Loading of Ropes of Single Wall Carbon Nanotubes and their Mechanical Properties. Physical Review Letters 84, 5552-5555 (2000).

M.-F. Yu et al., Strength and Breaking Mechanism of Multiwalled Carbon Nanotubes Under Tensile Load. Science 287, 637-640 (2000).

P. A. Kralchevsky, K. Nagayama, Capillary interactions between particles bound to interfaces, liquid films and biomembranes. Advances in Colloid and Interface Science 85, 145-192 (2000).

P. A. Kralchevsky, N. D. Denkov, Capillary forces and structuring in layers of colloid particles. Current Opinion in Colloid & Interface Science 6, 383-401 (2001).

B. Dan, G. C. Irvin, M. Pasquali, Continuous and Scalable Fabrication of Transparent Conducting Carbon Nanotube Films. ACS Nano 3, 835-843 (2009).

K. Tohji et al., Purifying single-walled nanotubes. Nature 383, 679-679 (1996).

K. Tohji et al., Purification Procedure for Single-Walled Nanotubes. The Journal of Physical Chemistry B 101, 1974-1978 (1997).

P. E. Savage, Organic Chemical Reactions in Supercritical Water. Chemical Reviews 99, 603-621 (1999).

M. D. Bermejo, M. J. Cocero, Supercritical water oxidation: A technical review. AIChE Journal 52, 3933-3951 (2006).

J.-Y. Chang, A. Ghule, J.-J. Chang, S.-H. Tzing, Y.-C. Ling, Opening and thinning of multiwall carbon nanotubes in supercritical water. Chemical Physics Letters 363, 583-590 (2002).

N. D. Denkov et al., Two-dimensional crystallization. Nature 361, 26-26 (1993).

A. S. Dimitrov, C. D. Dushkin, H. Yoshimura, K. Nagayama, Observations of Latex Particle Two-Dimensional-Crystal Nucleation in Wetting Films on Mercury, Glass, and Mica. Langmuir 10, 432-440 (1994).

B. Yakobson, L. Couchman, Persistence Length and Nanomechanics of Random Bundles of Nanotubes. J Nanopart Res 8, 105-110 (2006).

B. I. Yakobson, L. S. Couchman, Eds., Carbon Nanotubes: Supramolecular Mechanics, (Boca Raton, 2007), pp. 587-601.

N. B. Bowden, M. Weck, I. S. Choi, G. M. Whitesides, Molecule-Mimetic Chemistry and Mesoscale Self-Assembly. Accounts of Chemical Research 34, 231-238 (2001).

\* cited by examiner

MANUFACTURING OF MACROSCOPIC NANOMATERIALS USING FLUID UNDER ELEVATED TEMPERATURE AND PRESSURE

CROSS-REFERENCE TO RELATED APPLICATIONS

The present application claims priority to provisional U.S. Patent Application Ser. No. 62/171,744 filed on Jun. 5, 2015, titled, "Scalable Manufacturing of Macroscopic Nanomaterials Superstructures," and provisional U.S. Application Ser. No. 62/172,071 filed on Jun. 6, 2015, titled, "Manufacturing of Macroscopic Nanomaterials Using Supercritical Water," which are hereby incorporated by reference in their entirety.

BACKGROUND OF THE INVENTION

1. Field of the Invention

This invention relates to manufacturing carbon nanotube superstructures. More specifically, it relates to using liquids in different physical states to assemble carbon nanotubes into desired assemblies.

2. Brief Description of the Prior Art

The discovery of carbon nanotubes (CNTs) represents a major achievement in materials science, and their extraordinary properties have the potential to revolutionize many aspects of our lives and industries. An important requirement may be to integrate CNT processing with conventional manufacturing processes (known as top down manufacturing) through the development of organized CNT bulk materials (e.g. fibers, sheets and foams). Despite tremendous progress made in the past two decades, presently realized mechanical, thermal, and electrical properties of CNT macrostructures such as fibers, yarns, and sheets remain significantly lower than those of individual CNTs. One of the most significant challenges for industry to adopt these materials is a lack of suitable technology for the cost-effective scalable manufacturing of macroscopic parts and components in different forms using the nanomaterials as the building blocks while preserving their intrinsic properties.

Macroscopic forms of CNT assemblages may comprise a thin sheet (also known as "buckypaper" or "buckytape"), fibers, yarns, cables, and the like. Ideally, pure CNT assemblages would enable the highest mechanical and transport properties since such materials would maximize the use of the intrinsic nanotube properties. However, previous studies have shown that the pure CNT assemblages only possess limited properties far below the intrinsic nanotube properties. Research into making CNT fibers and yarns, the other common form of CNT assemblages, has progressed steadily. Compared to fibers, improving CNT sheet assemblage is more challenging because of the much larger dimensions and increased difficulty of defects control and reduction.

Both theoretical and experimental studies have concluded that to fully realize the intrinsic capabilities of single CNTs in these one- or two-dimensional macroscopic bulk forms, it may be important to align and pack CNTs to form large ordered structures to maximize the translation of the tubes' axial properties to those of the fiber or films. Optimal CNT packing and reduction/elimination of defects may further enhance the properties. To achieve this goal there are requirements for both the CNT materials and the process to fabricate CNTs into macroscopic assemblies.

Accordingly, what is needed is a process to produce defect-free CNTs that are aligned and more densely packed. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of the prior art discussed above. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

Various embodiments may comprise a method for removing impurities from carbon nanotube materials. A carbon nanotube structure may be oxidized under elevated temperature and pressure to expose impurities contained with the structure. The oxidation may occur by placing the carbon nanotube structure in a mixture of a processing fluid and an oxidizer. The temperature and pressure may be above the critical point of the processing fluid. The exposed impurities may be removed by contacting the oxidized carbon nanotube structure with an acid, such as an inorganic acid.

Additional embodiments may comprise a method for removing impurities from a carbon nanotube material and producing an oriented carbon nanotube material. A carbon nanotube material may be obtained in which carbon nanotubes are randomly oriented and an impurity is contained in within the material. The randomly oriented carbon nanotube material may be placed in a mixture of a processing fluid and an oxidizer. In various embodiments, the processing fluid may comprise water, and the oxidizer may comprise oxygen, ozone, hydrogen peroxide, or any other oxidizer known in the art. The randomly oriented carbon nanotube material and the mixture may be subjected to a temperature and pressure greater than a critical point of the processing fluid such that the carbon nanotube material is fractured thereby exposing the impurity. The temperature and pressure may be lowered to ambient conditions, and the exposed impurity may be contacted with an acid to remove the impurity. The acid may be an inorganic acid such as, but not limited to, hydrochloric acid or nitric acid. The carbon nanotube material may be subjected to a tensile force thereby orienting the carbon nanotubes in a direction of the tensile force.

Still further embodiments may comprise a carbon nanotube structure comprising a carbon nanotube material in which carbon nanotubes are randomly oriented and an impurity is contained within the material. The impurity may be subsequently removed and the carbon nanotubes substantially oriented by contacting the carbon nanotube material with a mixture of a processing fluid and an oxidizer under elevated temperature and pressure to expose the impurity, lowering the temperature and pressure to ambient conditions, contacting the exposed impurity to an acid to remove the impurity, and subjecting the carbon nanotube material to a tensile force thereby orienting the carbon nanotubes primarily in a direction of the tensile force.

The long-standing but heretofore unfulfilled need for a process to produce defect-free CNTs that are aligned and more densely packed is now met by a new, useful, and nonobvious invention.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Both theoretical and experimental studies have concluded that to fully realize the intrinsic capabilities of single CNTs in one- or two-dimensional macroscopic bulk forms, it may be important to align and pack CNTs to form large ordered structures to maximize the translation of the tubes' axial properties to those of the fiber or films. Optimal CNT packing and reduction/elimination of defects may further enhance the properties. To achieve this goal there are requirements for both the CNT materials and the process to fabricate CNTs into macroscopic assemblies.

Carbon nanotubes in essence are macromolecules with substantial flexibility. A variety of defects may arise during the assembly of CNTs into macroscopic form, such as chain ends, chain entanglement, voids, and foreign objects. The presence of such defects may significantly affect the physical properties of the macroscopic materials. Technologies have been developed (from both the raw materials front and processing technology side) to overcome these obstacles. Thus ultra-long near structural-defect-free single or double-walled nanotubes have been developed with reduced chain ends and chain entanglement. Their tendency to assemble in parallel into bundles and collapsed with flattened tube walls may further enhance the packing and increases the contact area for inter-tube load transfer.

Figures 1A, 1B:
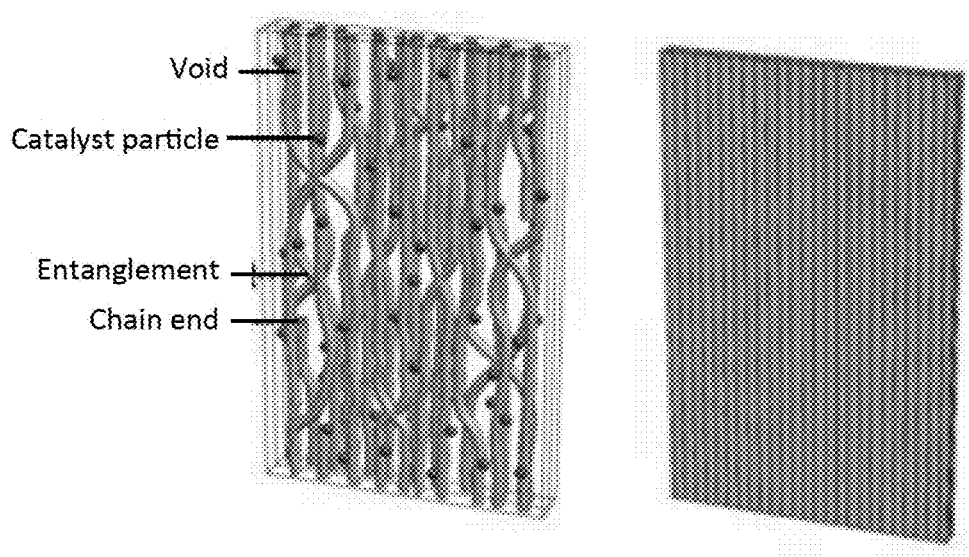
FIG. 1A is a schematic of a carbon nanotube assemblage illustrating typical defects.
FIG. 1B is a schematic of a carbon nanotube assemblage illustrating an ideal structure.

FIG. 1A illustrates a typical CNT assemblage or structure (or superstructure). Defects that may be present comprise voids/porosity, tube ends, impurities (primarily catalyst particles) from nanotube synthesis, and random orientation and entanglement of tubes. FIG. 1B illustrates an ideal CNT assemblage without such defects.

To reduce the number of nanotube ends in the assemblage, millimeter long nanotubes were developed. The long nanotubes also enable development of entanglements, which are defects in the ideal graphitic crystal structure, but in practicality are critical to allow for adequate structural integrity and mechanical strength to withstand follow-up processing. The majority of efforts to improve the properties of the CNT assemblage by follow-up processing are to align the nanotubes along their longitudinal direction. CNT assemblages may be aligned either in-situ or ex-situ using many types of forces such as electrical, magnetic, shear force, and mechanical tension. The alignment improves packing, reduces porosity, and increases density of the assemblage, leading to significant property improvements.

Using mechanical tension to stretch commercially available preformed CNT assemblages may exhibit potential for scalable manufacturing and commercial relevance. The technology may use a medium, typically a viscous polymer, to transfer load between the nanotubes for alignment. This process is typically simple to implement, low cost, and efficient.

Current CNT assemblage manufacturing faces the following key challenges. Large amounts of impurities, primarily catalysts, may be extremely difficult to remove without damaging the nanotube structure and deteriorating its physical properties. Mechanical alignment may rely on a medium for load transfer and may not be suitable for manufacturing neat assemblages with a high degree of alignment. Imposed mechanical tension is uniaxial and no compaction force may exist in the transverse and through-thickness direction for facilitate packing. The lack of efficient through-thickness compaction may become a critical obstacle because the CNT assemblages produced by current manufacturing methods possess a multi-layer morphology in which through-thickness nanotube interactions are significantly lower, resulting in much lower through-thickness properties. No current mechanism or technology can achieve interaction force between the nanotube bundles, which is critical to maximize the reduction of porosity and packing. High-performance CNT assemblages with dimensions suitable for industrial application (thickness in the range of tens of microns) remains elusive.

Impurities, such as residual catalysts, amorphous carbons, and other carbon compounds including fullerenes, from the nanotube synthesis remains the single biggest source of defects that both prevent complete alignment and serve as a stress concentrator. The predominant impurity, which is also the most difficult to remove, is the metal catalyst. The catalyst may be encapsulated by "shell carbons" comprising a few distorted graphitic layers of carbon of high curvature. Iron is the most commonly used catalyst for the synthesis of the majority of CNT assemblages. The resulting defects severely impact the physical properties of the final assembly. The presence of residual metal catalysts in CNTs can severely limit mechanical properties of CNT sheets, since the catalyst particles hinder the alignment of CNTs, prohibiting achieving larger CNT bundles and also introduce defect sites into CNT sheets. The structural defects resulting from residual catalysts act as stress concentrators which severely degrade the mechanical properties of the CNT assemblage. The residual catalysts may also present a steric hindrance and severely interfere with the alignment and proper packing of the nanotubes. The residual catalysts may also impose corrosion concerns.

For this reason, the removal of catalyst particles can be considered as an effective strategy to improve the mechanical properties of stretched CNT sheets. However, to do so with current purification methods, such as strong acid oxidation and thermal oxidation, often results in a dramatic reduction in the mechanical properties in the CNT sheets. The problem can be attributed to two factors: (a) the difficulty in controlling the oxidation to achieve high-yield purification while maintaining the nanotube quality, and (b) the application of treatment processes, involving sonication and/or reflux. Therefore, the development of a new purification process according to various embodiments has become crucial for producing high-performance CNT sheets.

To increase packing density and alignment to increase the tube-tube contact and load transfer, a variety of process strategies have been explored. The first type can be categorized as one-step solid-state process wherein CNTs are synthesized after which CNTs may be spun into fiber or films either from a vertically grown CNT forest on a substrate, or from the synthesis reaction zone. Fibers and thin films (of a few microns) have been produced.

The CNT forest-based route perhaps yields the best performance, providing a direct way to control CNT alignment and packing density in CNT sheets by drawing or pushing down the vertically grown CNT forests. Recently a new technique, called micro-combing was reported to be able to reduce the CNT waviness and further improve alignment of films drawn from a vertically grown CNT forest. Unfortunately, this method is seriously limited to "as-grown" forest sizes and can only produce very thin films (a few micron or less in thickness). The imposed strain rate and stress in the pushing down process (whether "domino" or "shear pressing") is quite low and ineffective in unidirectional alignment. Direct drawing, employed in both types of one-step processes, while achieving far higher strain for higher degree of alignment is complicated by the equipment design to achieve high speed, and the drawability of films initially out of the reaction zone, which are dictated by the synthesis process which itself is very complicated.

Because of the coupling of several complicated steps into one process, the process may be difficult to scale up and optimize to achieve the desired packing and alignment. Catalysts are still entrapped in the macrostructures, interfering with packing and alignment. While the best performance fiber has been reported by using this method, the main contributor for the observed performance is the long nanotubes from the synthesis. Addressing the catalyst concerns may further improve alignment. The observed properties of the fibers may also be much lower when a more relevant gauge length is used. Throughput is also a concern.

Aligned structure can also be produced by using external forces to align pre-synthesized CNTs dispersed in a suitable medium, for example, by filtering the CNT suspension in strong magnetic fields. However, such a procedure is very expensive due to the sophisticated equipment necessary, requiring a trade-off between cost and performance. Recent investigation on alignment focused on using mechanical force such as tensile stress.

Various embodiments may comprise mechanisms and processing technology for the scalable, cost-effective manufacturing of neat CNT assemblies of superior alignment, packing, and crystallinity. Such pure or neat assemblages of CNTs may minimize imperfections/defects, maximize load transfer for mechanical properties, and maximize transport properties. Such improvements may maximize the utilization of the intrinsic nanotube properties and lead to macroscopic pure (or nearly pure) CNT materials and structures with properties approaching their theoretical performance limit. Various embodiments may be applicable to the manufacture of both 1-dimensional nanoparticle superstructures, such as fibers, yarns, and cables, and 2-dimensional nanoparticle superstructures such as sheets. Non-limiting exemplary 1-dimensional nanoparticle superstructures may comprise boron nitride nanotubes, vanadium oxide nanotubes, and the like. Non-limiting exemplary 2-dimensional nanoparticle superstructures may comprise nanosheets such as graphene, molybdenum disulfide, and the like.

As disclosed herein, various embodiments may comprise a process using a fluid to achieve an extremely high degree of carbon nanotube and crystal packing in one-dimensional fibers and two-dimensional CNT sheets (buckypapers) using a self-enforcing assembly process resulting from evolving lateral immersion capillary force. The processed buckypaper may exhibit unusually high mechanical properties (modulus 111 GPa, tensile strength 1.29 GPa), resulting from the extraordinary degree of alignment and packing (the buckypaper has a density of 1.8 g/cc, far higher than typical value reported and approaching the density of typical carbon-carbon composites). The process may be scalable and may produce a large quantity of the materials.

Various embodiments have produced 70%-80% stretched CNT sheets in a roll-to-roll form. These stretched CNT sheets show a tensile strength 0.53 GPa and a modulus of 40 GPa, almost 5 times stronger than as-received CNT sheets, and are comparable to the best pure CNT sheets reported (0.60 GPa strength, 15.4 GPa modulus). However, their performance still lags significantly behind the mechanical properties of single CNTs, which typically show tensile strength between 11 and 63 GPa and modulus on the order of 1 TPa.

Any fluid may be used, and selection of a particular fluid may be based on vaporization characteristics, surface tension characteristics, and phase diagram. These selection criteria, along with temperature, pressure, and tension applied to the CNT assemblage may be selected to define the process. In various embodiments, the fluid used may be water. Water may serve several roles in the process. First, water molecules are believed to have the ability to break or fracture the network between CNTs, amorphous carbon, and metal (catalyst) particles with the assistance of a small amount of weak oxidizer. This capability is significantly stronger in supercritical (superheated) water, which is a moderate oxidizer for economic and green reactions and may even cause opening and thinning of CNTs by partially disrupting the nanotube structure. Together with a low concentration of oxidizer, supercritical water may rupture and open the graphitic cage that encloses iron catalyst particles, such that removal of the iron particles by moderate strength acid (such as hydrogen chloride) from the aligned CNT sheets may be possible. Removal of the catalyst particles may remove a significant source of structure defects.

A wide variety of oxidizers may be used to form a mixture with the water (or other processing fluid). Non-limiting examples of oxidizers that may be used in various embodiments comprise oxygen, ozone, hydrogen peroxide and other inorganic peroxides, chlorine and other halogens, chlorite, hypochlorite, chlorate, perchlorate, hypohalite compounds, hexavalent chromium compounds, permanganate compounds, sodium perborate, nitrous oxide, potassium nitrate, and mixtures thereof.

Compared to ambient liquid water, supercritical water has far fewer and weaker hydrogen bonds and a very low dielectric constant, comparable to that of a typical organic solvent. These properties, along with the high solubility of many gases and the substantial reactivity, make supercritical water an attractive and environmentally benign reaction medium or reactant. Using water for impurity removal has a number of advantages. Supercritical water is an effective oxidizer and its capabilities may be tuned over broad ranges. This may offer the possibility of using pressure and temperature to tailor the reaction to be directed toward the cage graphitic carbon, which is more reactive than the nanotube side walls ends while minimally reacting with the crystallized well-organized nanotubes. The reaction can be further tailored by adding an oxidizer (such as oxygen and/or hydrogen peroxide) as an additional oxidizer, taking advantage of their complete miscibility with water under supercritical conditions.

This process may ensure efficient impurity removal without perturbing the basic nanotube structure, preserving its properties. The greatly reduced surface tension on supercritical water, and the absence of surface tension under supercritical conditions, may ensure uniform contact and complete wetting by water within the nanoscale confined space, resulting in more thorough and uniform reactions and impurity removal. Removal of the impurities may alter the thermodynamic state of the assemblage such that alignment of the carbon nanotubes is possible. In general, some type of force is applied to align the carbon nanotubes, with mechanical force being the most prominently used.

Mechanical force is macroscopic in nature and its exertion may be uniform across the entire CNT assemblage. This may result in two limitations. First, there is a realistic upper limit in terms of the force that can be applied upon each individual tube. Second, the alignment heavily depends on the load transfer medium and its effectiveness. It is understood that shear stress that is responsible for the alignment is proportional to the viscosity of the transfer medium. Although a higher viscosity transfer medium would result in higher stress and is better for alignment, its uniform impregnation and proper wetting with the tube surfaces is progressively more challenging posing limitation on the applicability of this route. Local deficiencies in resin impregnation may preclude or reduce stress transfer by shear between some of nanotube bundles and result in flaws in the macrostructures.

Nevertheless the highest alignment achieved in buckypaper was accomplished via various embodiments. Magnetic force, while presumably acting directly on individual CNTs, is relatively less effective in aligning the CNTs due to the weak magnetic dipole of CNTs and the field strength that can be realized. Equipment cost and accessibility is also a major concern with using magnetic force. Capillary interactions, on the other hand, possess several intrinsic advantages. The attractive force acts directly on individual tubes, ensuring the packing and assembly in macroscopic scale throughout the sheets. In addition, the lateral capillary force acts over a broad range of length scale, and the strength can be comparable and/or stronger than the tube-tube van der Waals force. Again, this may greatly facilitate the assembly and packing of CNTs over a large scale.

A new method, as described below, has been developed to apply mechanical force to the carbon nanotubes that overcomes the drawbacks of previously known methods. Under supercritical conditions, water may possess near zero surface tension, which may allow penetration into all regions of the CNT for more complete reaction. Compared to other catalyst removal technology being explored, various embodiments may impose milder conditions and result in reduced damage to the nanotubes. The near zero surface tension under supercritical conditions may lead to complete wetting of the low surface energy carbon surface and uniform infiltration of water in between the carbon nanotubes. The water may remain entrapped in the submicron, confined space between the nanotubes. This may lead to a perturbed meniscus and may result in immersion capillary forces between the tubes. This may not be possible under other conditions because the surface tension probably would have prohibited the thorough infiltration throughout the nanoscale interstitials between the nanotubes, as this would have greatly raised the system energy.

In fact, such high-energy state achieved by impregnation by supercritical condition and the system's tendency to achieve a lower energy state at subsequent processing temperature is the origin of the attractive capillary force. The attractive capillary force is the source of self-enforcing assembly that is similar to two-dimensional crystallization of colloids. The pair-wise energy and attractive force were calculated for various embodiments. The energy potential had a magnitude comparable or significantly higher than the inter-tube potential due to the van der Waals interaction, but extended over much great inter-tube distance (the range of the interactive energy extends to mm). Macroscopic assemblies of millimeter objects were reported because of the long-range interactions. Compared to other types of forces, the capillary interaction realized by various embodiments possess several unique advantages that may hold greater promise for massively aligned highly crystalline CNT superstructure approaching the properties of the individual CNTs. There is however intrinsic limitation that impede the further improvement in alignment and packing using this route.

Various embodiments may comprise a method to used to align CNTs comprising self-enforcing assembly from the interaction force of overlapping meniscus (herein referred to as "SEA-IFOM"). The IFOM around partially immersed particles in a fluid may direct the assembly and packing of CNT assemblages with well-organized, pseudo-crystalline materials with long-range order. In various embodiments, water may be used as the working fluid.

Partial immersion of particles in a fluid deforms the initially flat gas-liquid interface, and a meniscus forms around each of the particles. Such deformations increase the interfacial area and raise the interfacial energy. The overlap of the perturbations in the meniscus between neighboring particles results in interactive forces. IFOM (also referred to as lateral capillary forces) may be attractive when the particles are both hydrophilic or both hydrophobic, or repulsive between a hydrophilic-hydrophobic pair. IFOM is different from capillary forces. IFOM results from interactions of overlapping meniscus, whereas capillary forces result from isolated meniscus.

Figure 2:
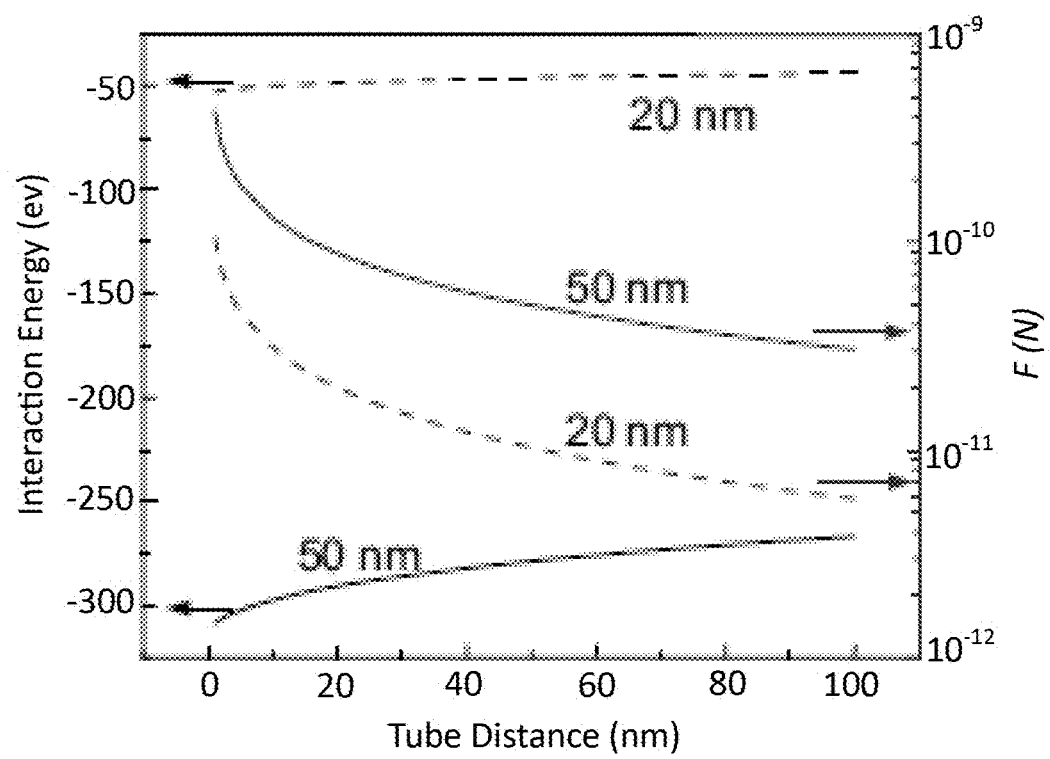
FIG. 2 is a graph of interactive energy and attractive forces between identical pairs of cylinders of similar size to typical nanotube bundle sizes (T=25° C.).

IFOM may directly act on individual nanotube bundles with proper impregnation with water, and may act over a very large length range, from about 1 nm to 1 cm. IFOM's operable length range fully covers typical bundle distance, providing a mechanism for bundle assembly. Additionally, IFOM is a force of high strength. FIG. 2 shows the calculated interaction energy and attractive force between nanotube bundle pairs of different sizes from 20 nm to 50 nm. The interaction energy ranged between about −50 and −300 eV, and attractive force was between pico- to nano-Newton between bundles of typical size (20 to 50 nm) and bundle distances (10 to 100 nm). Importantly, the interactions become stronger as the bundles approach each other, indicating IFOM will enable a self-enforcing assembly.

Since IFOM acts on the liquid-gas interface around the contact line, control of the moving interface front as the water evaporates may enable direct control of the rate of assembly to match the dynamic response of the bundles to facilitate improved crystalline packing and reduce defects. Macroscopically, IFOM may exhibit itself as a compressive force in both transverse direction in-plane and through thickness, providing a nanoscale uniform compaction on individual nanotube levels for packing of high efficiency.

The lateral capillary force realized in various embodiments may also fundamentally differ from previous studies on using capillary force and their role in perceived assembly of CNTs and routine use of capillary forces to condense the structure. In all these studies the force is the capillary-bridge force, which acts perpendicular to the plane of contact line, whereas the lateral capillary force act in the plane of contact line. The physical origin and the behavior are completely different. Lateral capillary force according to various embodiments may be responsible for a self-enforcing assembly mechanism akin to crystal nucleation and growth, whereas capillary-bridge force used in previous studies only leads to randomized clustering of the nanotubes. Another distinct difference is that the capillary-bridge force is attractive when the nanoparticle surface is hydrophilic and repulsive if both particle surfaces are hydrophobic, whereas the lateral capillary force may always be attractive as long as physical properties of both surfaces are the same (such as both are hydrophilic, or both are hydrophobic).

To realize a high degree of alignment and packing of CNTs from initially random CNTs sheets may require multiple steps and application forces of different effective range to achieve optimal results. Mechanical stretch may be first applied to realize substantial alignment and at the same time to densify the CNT structure and bring the tube-tube distance to the range where the lateral capillary force could be prominent. Various embodiments may then be used to further assemble the structure into superior crystallinity and packing. In addition, considering the long-range nature of the lateral capillary force realized in the current technology, it may also be possible to use the lateral capillary force alone to assemble the structure in one step, skipping the mechanical stretching altogether. The structure can be further optimized by applied dynamic tension, step tension, etc. during the assembly process.

Moreover, such capillary interactions resulting from using fluids in a supercritical state may be a universal approach for assembly other 1-D, 2-D and 3-D nano-objects into a diverse range of structures to realize all kinds of properties they may enable. Furthermore, fluids with different critical points and other physical characteristics (e.g., surface tension, volatility) may be available to tailor the strength and duration of such interaction to better suit the systems to be assembled. The process can be scaled up to industrial scale to produce macroscopic parts made of nanomaterials whose properties approach the intrinsic properties of the nanomaterials.

Figure 3:
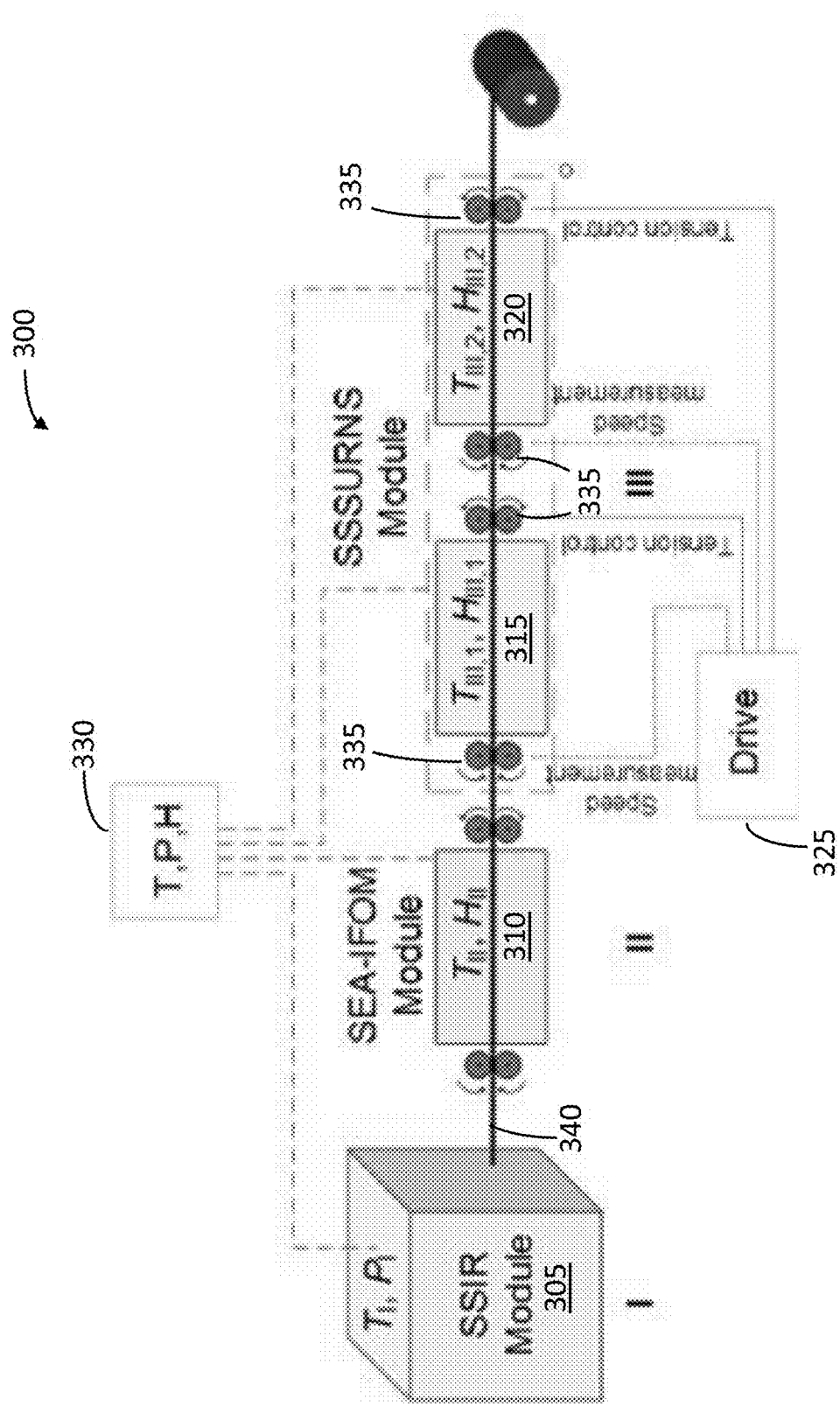
FIG. 3 is a schematic of roll-to-roll continuous manufacturing of highly aligned macroscopic assemblies of nanomaterials.

A schematic of a continuous process 300 is shown in FIG. 3 according to various embodiments. The process 300 may comprise three basic modules (labeled I, II, and III in FIG. 3). The first module (I) may comprise a site specific impurities (SSIR) module 305. The SSIR module 305 may function to remove impurities from a carbon nanotube assemblage 340 using the supercritical fluid process described previously. Process conditions controlled at the SSIR module 305 may comprise at least temperature and pressure.

After removal of the impurities, which may place the carbon nanotubes in a favorable thermodynamic state for alignment and densification, the carbon nanotube assemblage 340 may pass to a SEA-IFOM module 310. The SEA-IFOM module 310 may function to engage strong inter-bundle attractions using lateral capillary force. This may transform the weak CNT bundle network to an assemblage of higher strength resulting from mesoscale bundle assembly and formation of a pseudo-crystalline structure, which may effectively serve as large cross-links (crosslinking domains). Process conditions controlled at the SEA-IFOM module 310 may comprise at least temperature and humidity. Although FIG. 3 illustrates a single SEA-IFOM module 310, various embodiments may comprise more than one SEA-IFOM module 310. By using multiple SAE-IFOM modules 310, it may be possible to better tailor the number, size, and strength of this type of domains. The improved strength of the carbon nanotube assemblage 340 may allow it to withstand the stretching in the next module in the process.

After processing in the SEA-IFOM module 310, the carbon nanotube assemblage 340 may pass to one or more super-stretch strategy from understanding of rheology and network structure (SSSURNS) modules 315, 320. The one or more SSSURNS modules 315, 320 may help eliminate entanglement of long nanotubes. To achieve high performance, these weak interactions (entanglements) may be eliminated and replaced with bundle-bundle packing, which form graphite-like pseudo-crystallite. This may be accomplished without disrupting the integrity of the network and without macroscopic failure, which may require an understanding of the network deformation characteristics. Operation of the one or more SSSURNS modules 315, 320 may comprise an algorithm based on rheological characterization and constitutive modeling, coupled with course-grained molecular dynamics (CGMD) to define macroscopic deformation characteristics of the carbon nanotube assemblage 340 saturated with the process fluid (e.g., water) and structure evolution during alignment. Thus, by combining top-down mechanical alignment with bottom-up nanotube bundle assembly by SEA-IFOM, carbon nanotube assemblages 340 with properties approaching their theoretical limits may be achievable. Process conditions controlled at the one or more SSSURNS modules 315, 320 may comprise at least temperature, humidity, and tension.

During super stretch, the degree of tube bundle entanglement may be progressively reduced and replaced by further self-enforced bundle assemble by IFOM and further facilitated by mechanical stretching because of the continued presence of the processing fluid in the CNT network. The synergistic effect of the mesoscale IFOM and microscopic tension may result in a carbon nanotube assemblage 340 with a superior degree of alignment and a high level of graphite-like crystalline packing mimicking carbon fiber structures. The number of the one or more SSSURNS modules 315, 320 and the stretching conditions (temperature, humidity, and tension) may be selected based on empirical or theoretical data.

The process 300 may further comprise a drive controller 325 driving a plurality of drive rollers 335 located throughout the process 300. By controlling the relative speed of the individual drive rollers 335, an amount of tension being applied to the carbon nanotube assemblage 340 may be controlled and varied at any stage of the process 300. Additionally, the process 300 may comprise a process controller 330 which may function to control and vary process conditions such as, but limited to, temperature (T), pressure (P), and humidity (H) at any point in the process 300.

Figure 4:
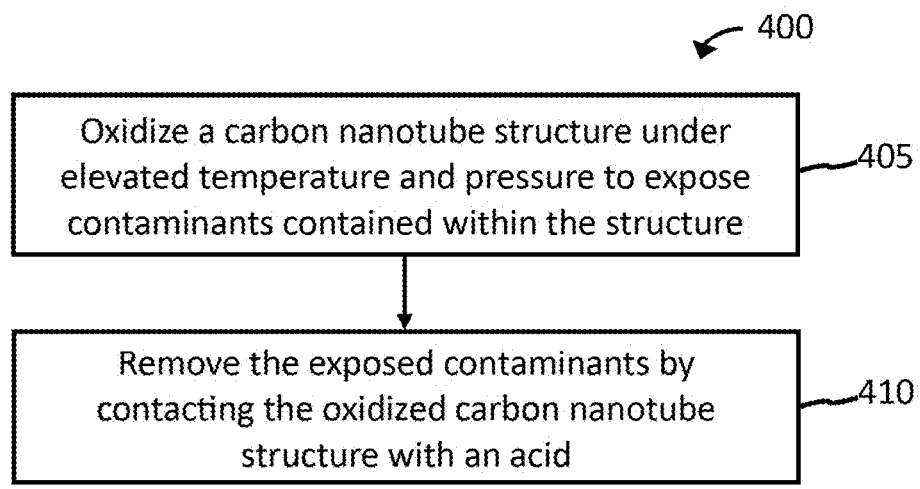
FIG. 4 is a flowchart of an exemplary method for removing impurities from carbon nanotube materials.

FIG. 4 is a flowchart of an exemplary method 400 for removing impurities from carbon nanotube materials according to various embodiments. At step 405, a carbon nanotube structure may be oxidized under elevated temperature and pressure to expose impurities contained with the structure. The oxidation may occur by placing the carbon nanotube structure in a mixture of a processing fluid and an oxidizer. The processing fluid may comprise water, and the oxidizer concentration in the mixture may range from about 0.1-1 mol/dm$^3$. The temperature and pressure may be above the critical point of the processing fluid. At step 410, the exposed impurities may be removed by contacting the oxidized carbon nanotube structure with an acid, such as an inorganic acid.

Figure 5:
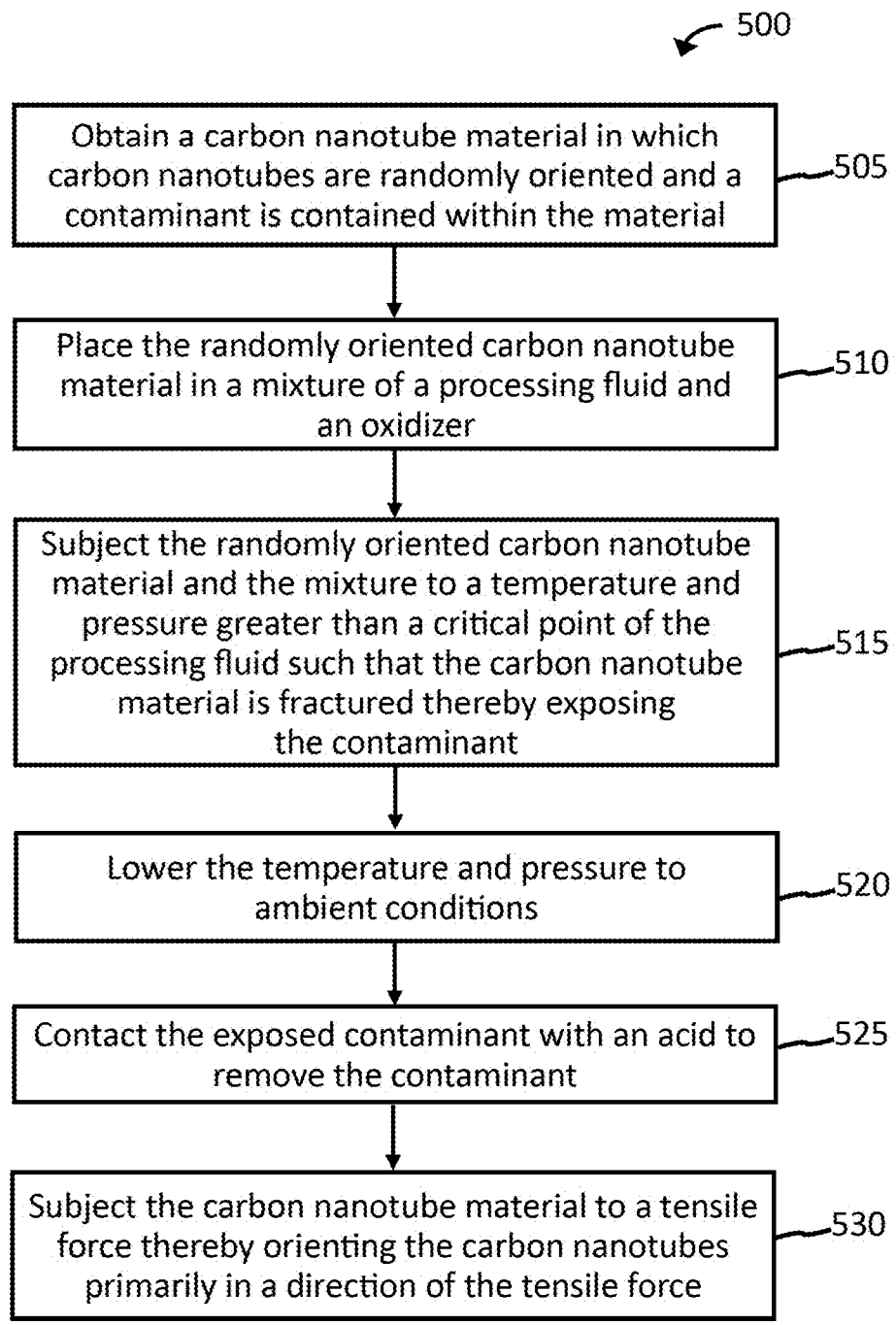
FIG. 5 is a flowchart of an exemplary method for removing impurities from a carbon nanotube material and producing an oriented carbon nanotube material.

FIG. 5 is a flowchart of an exemplary method 500 for removing impurities from a carbon nanotube material and producing an oriented carbon nanotube material according to various embodiments. At step 505, a carbon nanotube material may be obtained in which carbon nanotubes are randomly oriented and an impurity is contained in within the material. The randomly oriented carbon nanotube material may be placed at step 510 in a mixture of a processing fluid and an oxidizer. In various embodiments, the processing fluid may comprise water, and the oxidizer may comprise oxygen, ozone, hydrogen peroxide, or any other oxidizer known in the art. At step 515, the randomly oriented carbon nanotube material and the mixture may be subjected to a temperature and pressure greater than a critical point of the processing fluid such that the carbon nanotube material is fractured thereby exposing the impurity. The temperature and pressure may be lowered to ambient conditions at step 520, and the exposed impurity may be contacted with an acid at step 525 to remove the impurity. The acid may be an inorganic acid such as, but not limited to, hydrochloric acid or nitric acid. At step 530, the carbon nanotube material may be subjected to a tensile force thereby orienting the carbon nanotubes in a direction of the tensile force.

EXAMPLES

Figure 6:
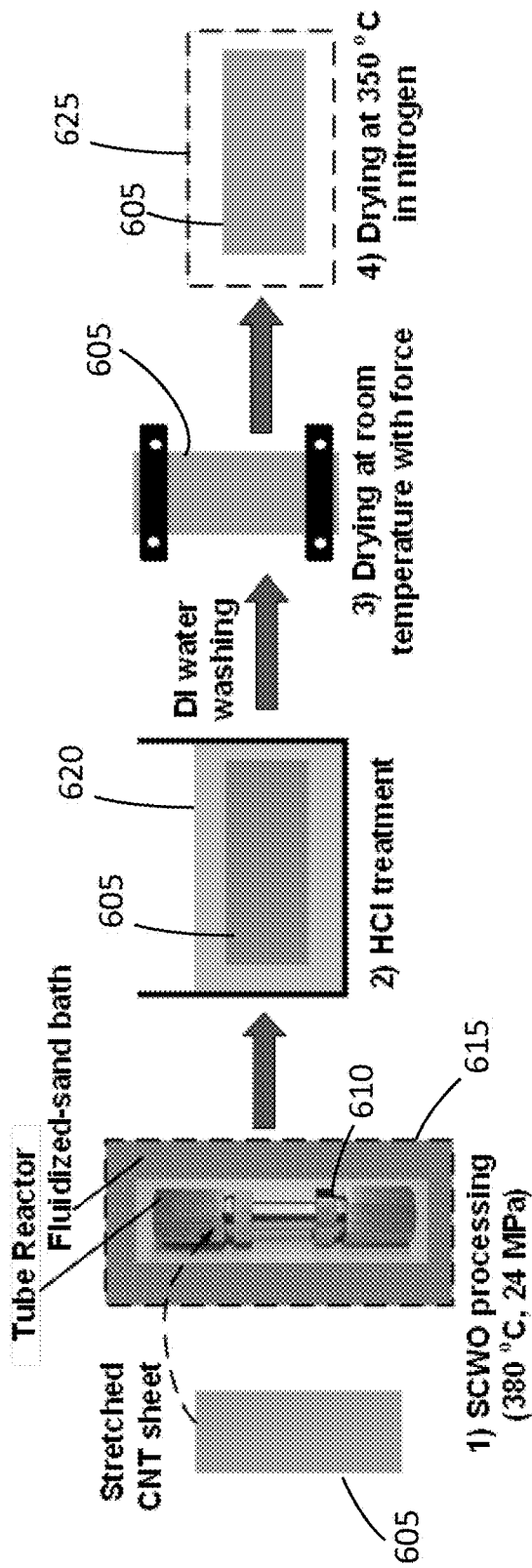
FIG. 6 is a schematic of experimental process for removing impurities from a carbon nanotube material and producing an oriented carbon nanotube material.
Figure 7:
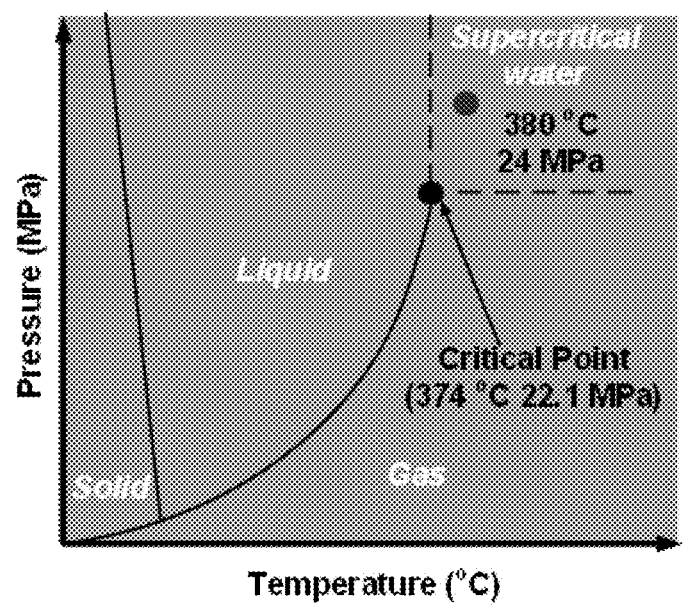
FIG. 7 is an illustration of the location of supercritical water process conditions on a phase diagram for water.
Figure 8:
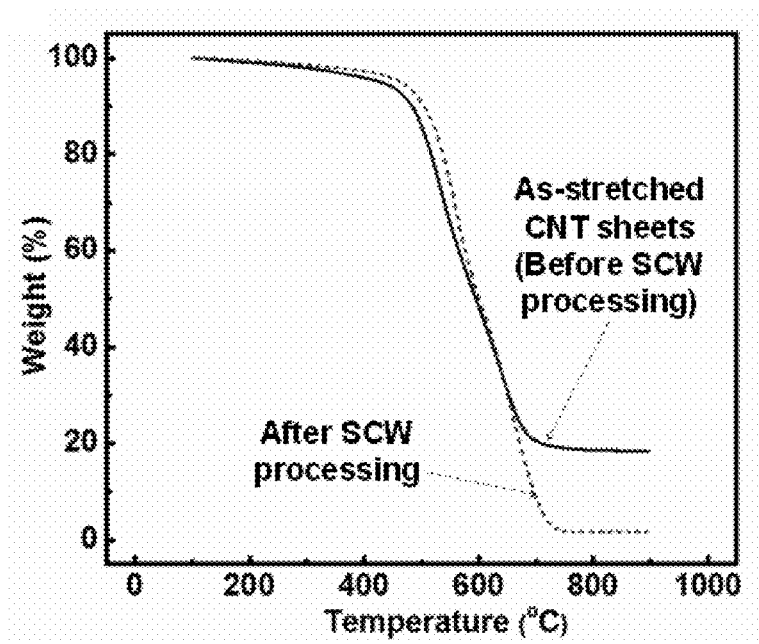
FIG. 8 is a graph showing TGA results of the CNT sheets (type A). Heating rate is 10° C./min.
Figure 9A:
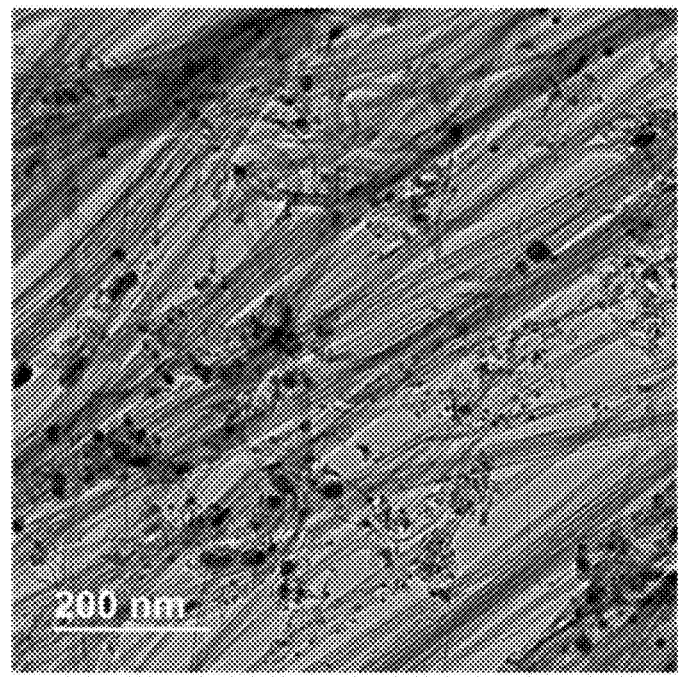
FIG. 9A is a TEM micrograph of a CNT sheet before supercritical water processing.
Figure 9B:
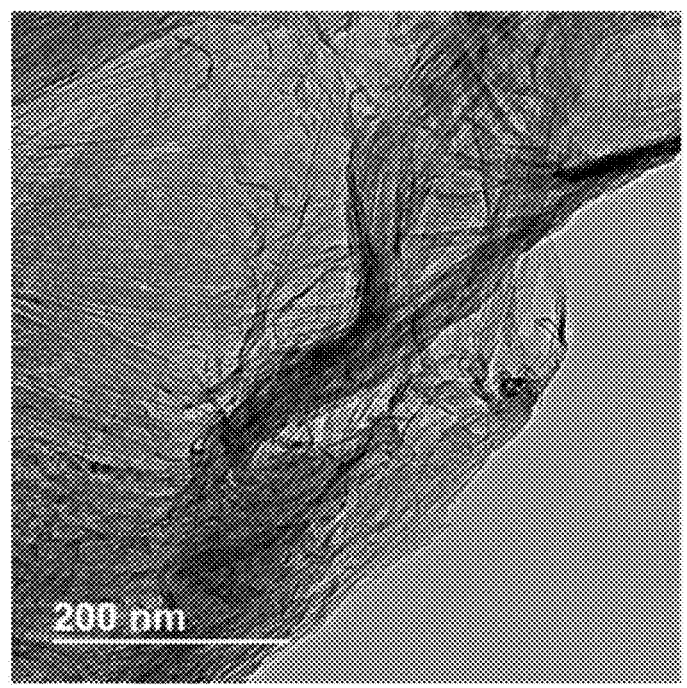
FIG. 9B is a TEM micrograph of a CNT sheet after supercritical water processing.
Figure 9C:
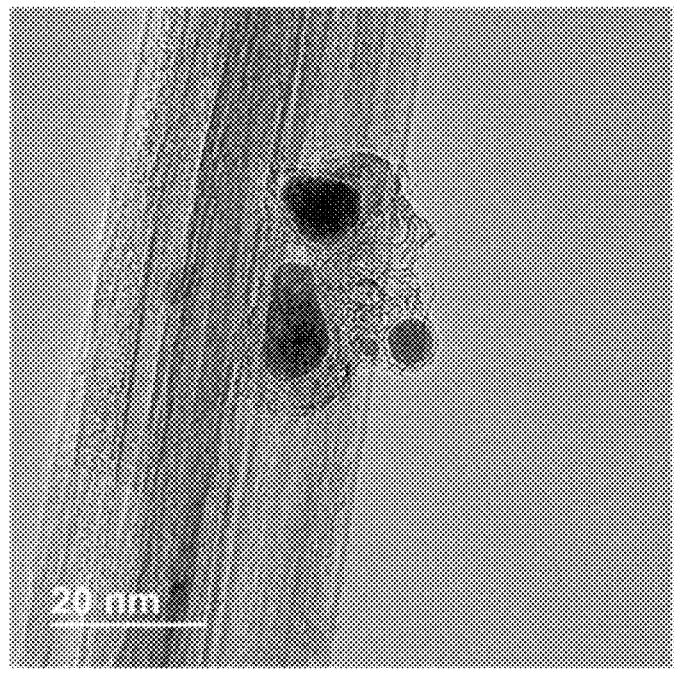
FIG. 9C is a higher magnification view of FIG. 9A
Figure 9D:
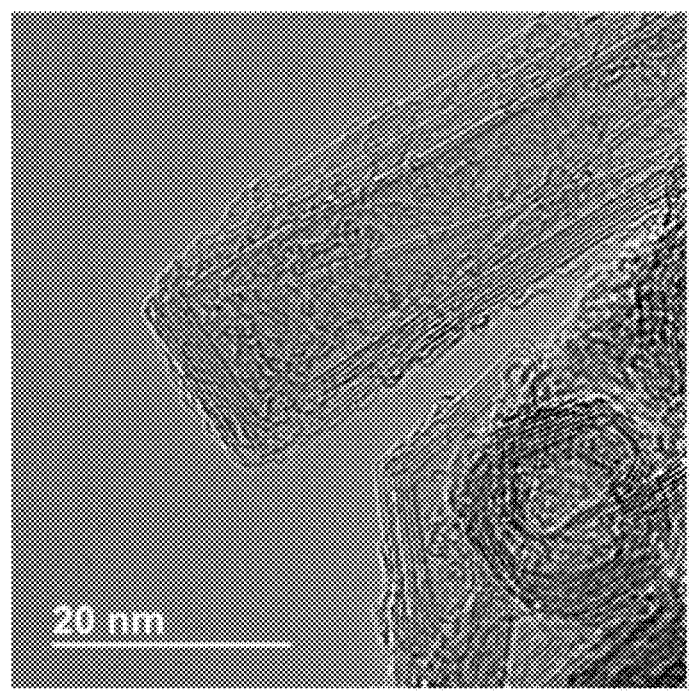
FIG. 9D is a higher magnification view of FIG. 9B.
Figure 10:
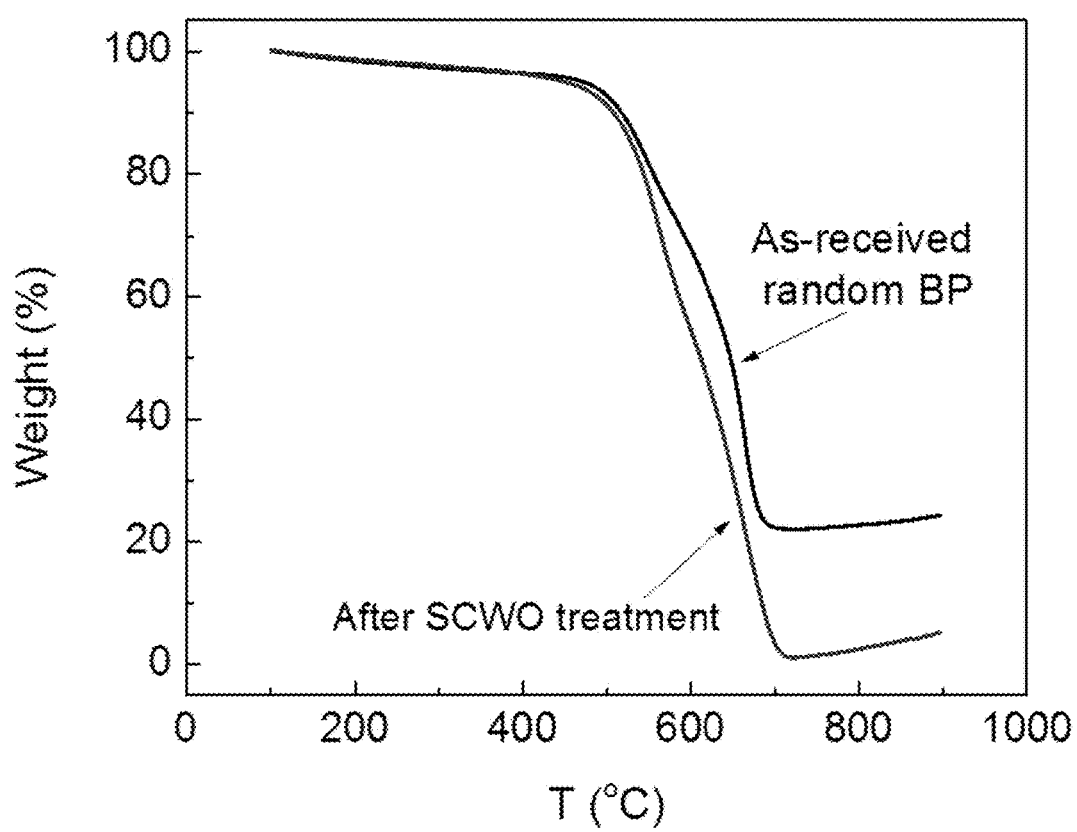
FIG. 10 is a TGA graph of a carbon nanotube sheet before and after supercritical water processing.
Figure 11A:
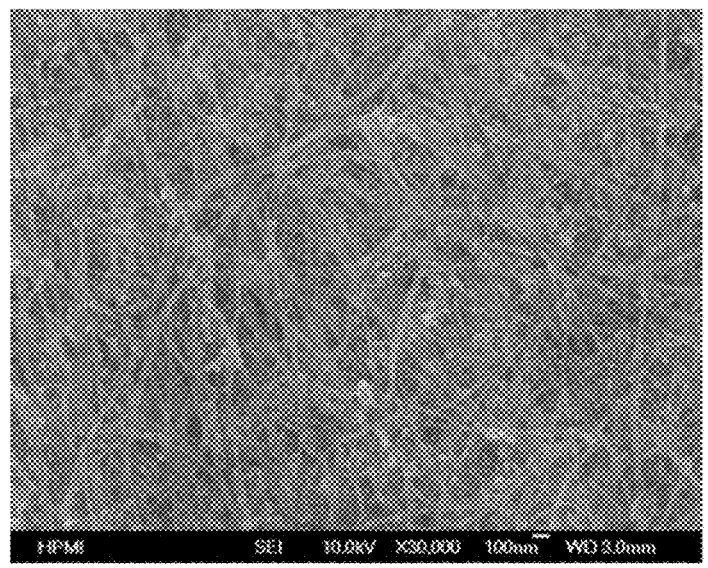
FIG. 11A is a SEM micrograph of a carbon nanotube sheet before supercritical water processing.
Figure 11B:
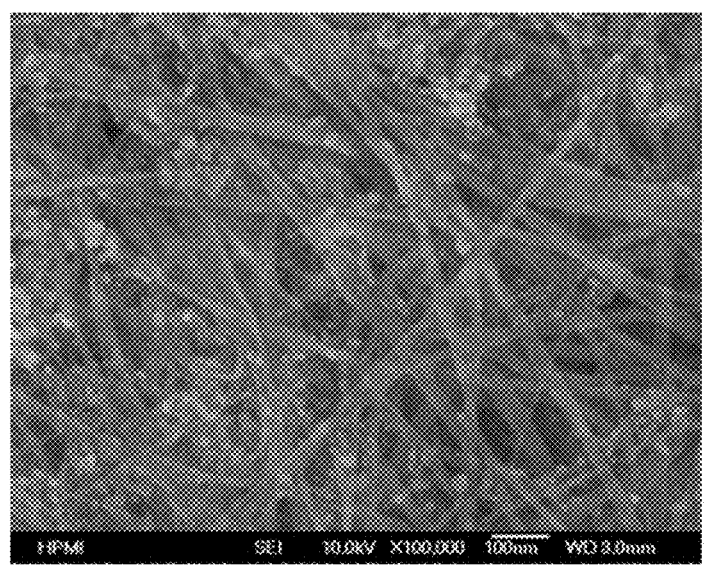
FIG. 11B is a SEM micrograph of a carbon nanotube sheet before supercritical water processing.
Figure 11C:
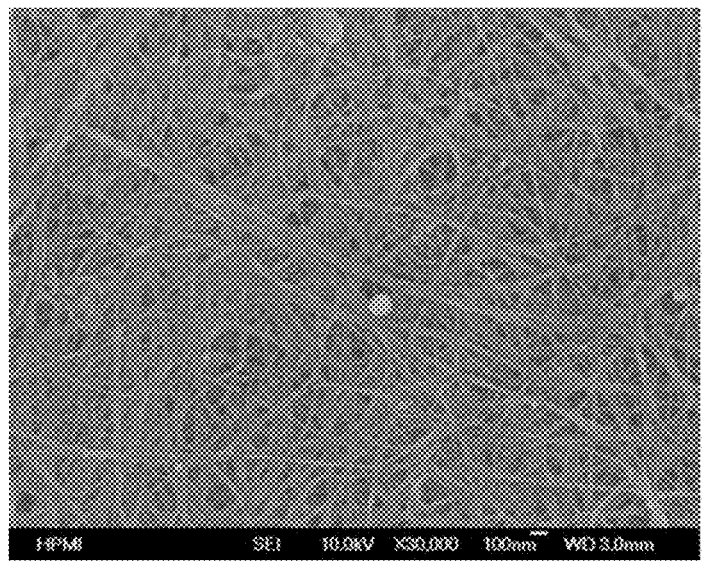
FIG. 11C is a SEM micrograph of the carbon nanotube sheet of FIG. 11A after supercritical water processing.
Figure 11D:
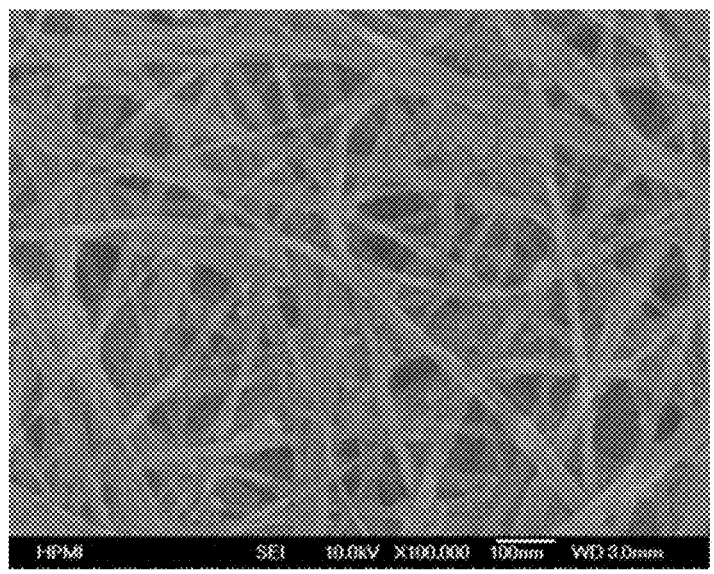
FIG. 11D is a SEM micrograph of the carbon nanotube sheet of FIG. 11B after supercritical water processing.
Figure 12:
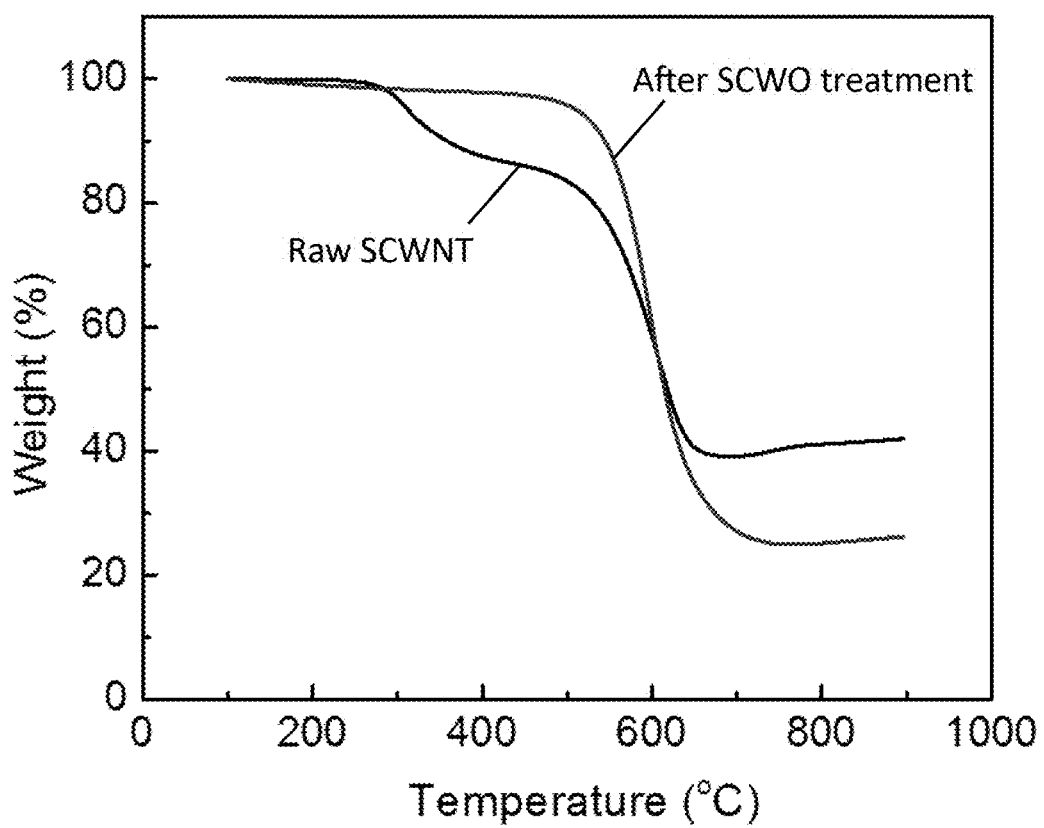
FIG. 12 is a TGA graph of a carbon nanotube material in powder form before and after supercritical water processing.
Figure 13A:
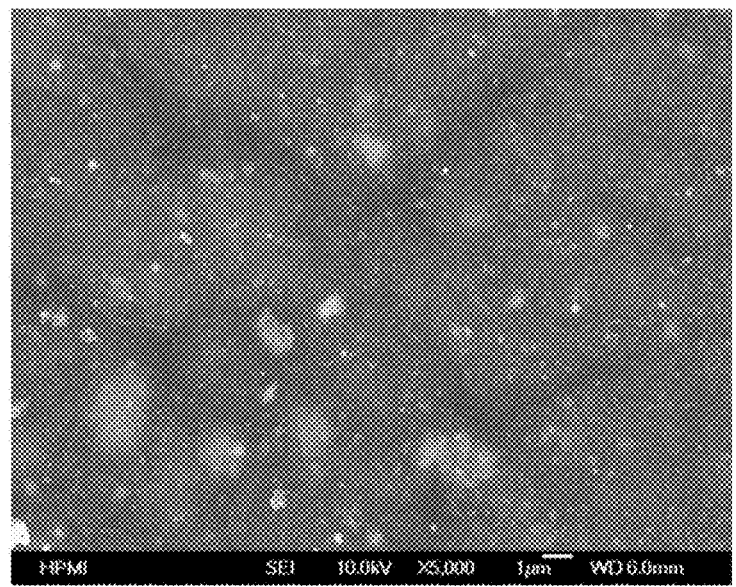
FIG. 13A is a SEM micrograph of a carbon nanotube sheet made of carbon nanotube powder before supercritical water processing.
Figure 13B:
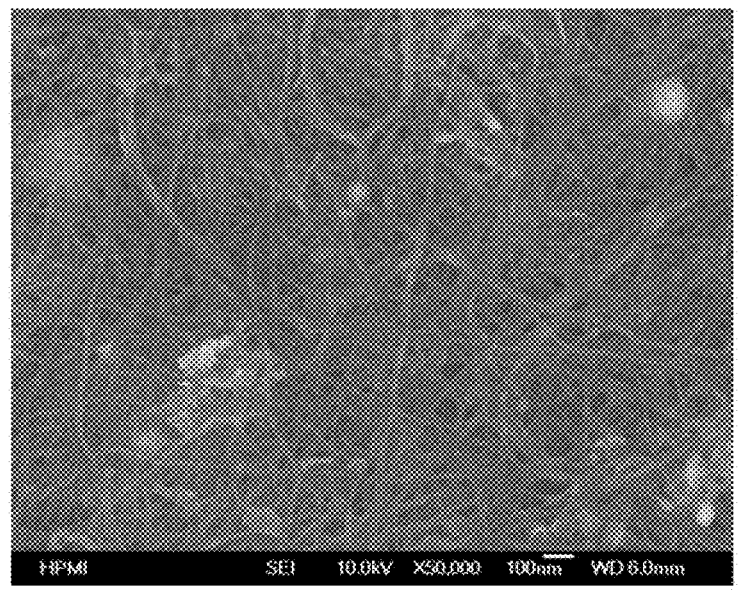
FIG. 13B is a higher magnification view of FIG. 13A.
Figure 13C:
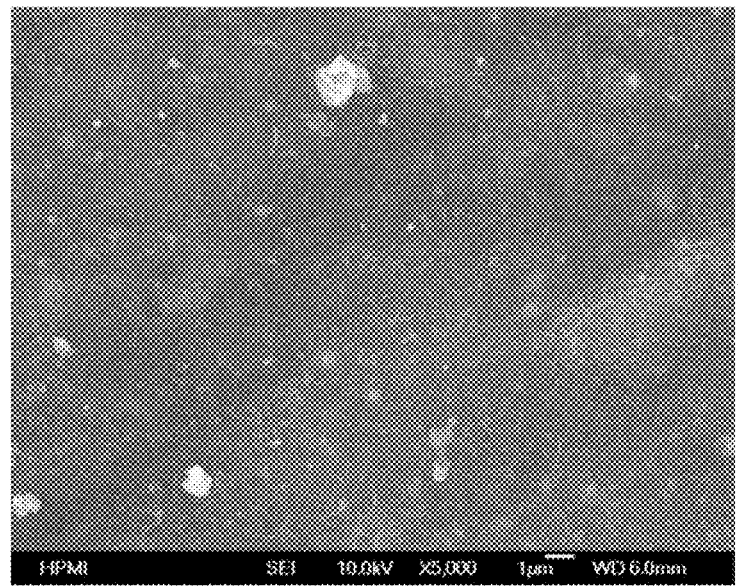
FIG. 13C is a SEM micrograph of a carbon nanotube sheet made of carbon nanotube powder after supercritical water processing.
Figure 13D:
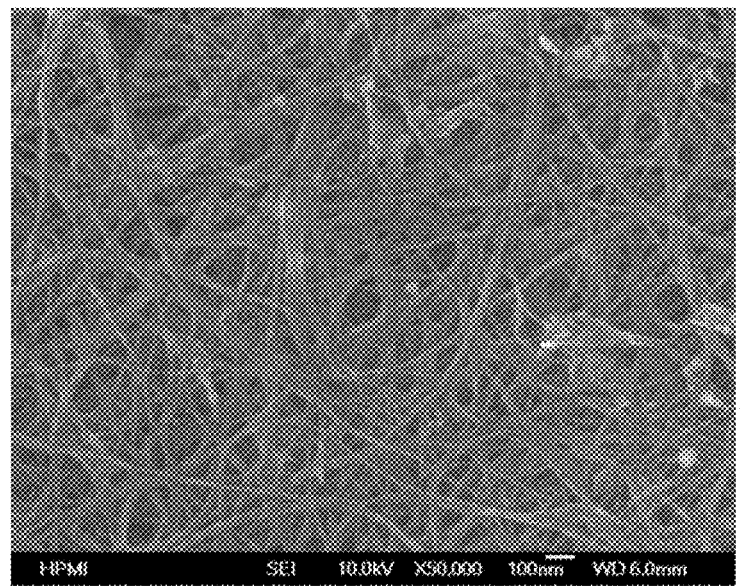
FIG. 13D is a higher magnification view of FIG. 13C.

A schematic diagram of the experimental setup according to various embodiments is shown in FIG. 6. First, mechanically stretched CNT sheets 605 were placed in a tube reactor 610, which was then filled with water containing 0.5 mol/dm$^3$ of $H_2O_2$. The reactor 610 was then placed within a fluidized-sand bath 615, and the temperature and pressure were raised to about 380° C. and 24 MPa, respectively, which is above the critical point of water (see FIG. 7). The CNT sheet 605 was treated for about 30 minutes at these conditions. The temperature and pressure of the reactor 610 were then reduced to ambient conditions, and the CNT sheet 605 was removed from the reactor 610. The CNT sheet 605 was then soaked in a hydrochloric acid (HCl) solution 220 for about 2 h, followed by washing in DI water. Finally, purified CNT sheets 605 were obtained after two-step drying method in an oven 625, which is explained further below. The purity of the CNT sheet 605 was evaluated by thermogravimetric analysis (TGA). As shown in FIG. 8, the residual weight dropped from about 20 wt % for the "as-stretched" (before super critical water processing) CNT sheets 605 to <2% for the processed CNT-sheets 605, demonstrating the high effectiveness of the process in purifying the CNT sheets 605. The TEM of the dissociated CNT sheet before after super critical water processing is shown in FIGS. 9A through 9D. Most of the catalyst particles (~12 nm in diameter) in the original stretched CNT sheets (FIGS. 9A and 9C) were observed to be almost completely removed (FIG. 9B). Moreover, careful examinations by HM-TEM revealed that the multilayer graphitic shells (FIG. 9C) around the catalyst particles were broken, which may make the catalyst particles accessible for removal, leaving behind an emptied ruptured cage (FIG. 9D). Apparently the super critical water-$H_2O_2$ under the reaction conditions was able to attack and react with the graphitic carbons, which presumably are more susceptible to the attacks due to the high curvature and associated strain energy.

The process was used to purify a second type of CNTs sheet (type B) and a third CNT in powder form, and the results are shown in FIGS. 10 through 13. In both cases, a significant amount of catalyst was removed from the materials, demonstrated by the greatly reduced amount of catalyst present in the system (measured by TGA, FIGS. 10 and 12), and the much cleaner SEM images (FIGS. 11A and 11B before treatment and FIG. 11C and FIG. 11D after treatment; FIGS. 13A and 13B before treatment and FIGS. 13C and 13D after treatment).

Figure 14A:
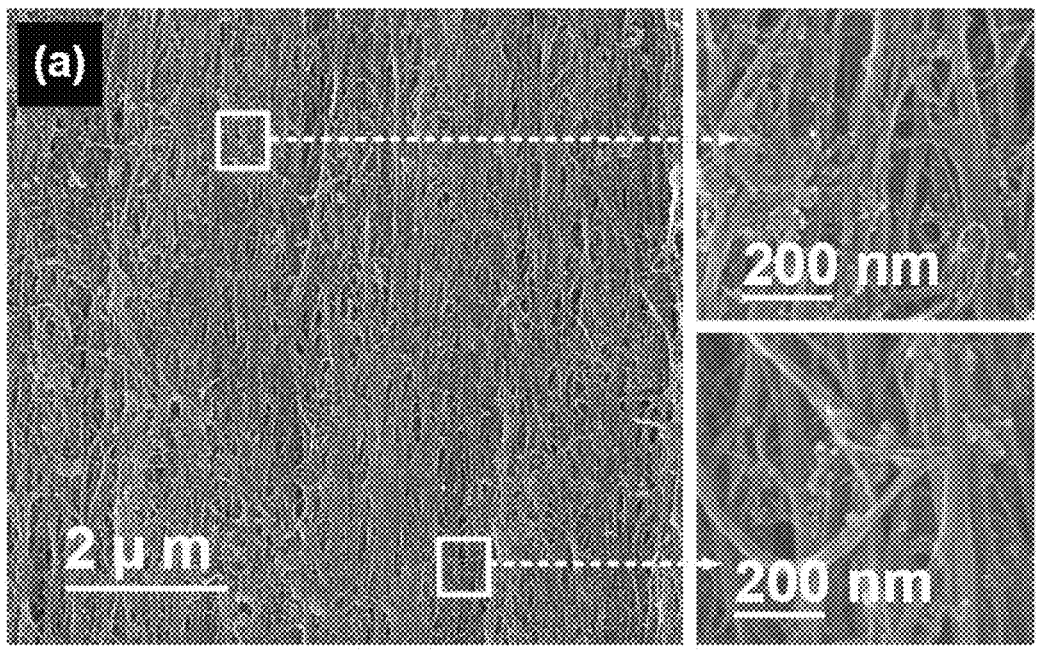
FIG. 14A shows the morphology of a carbon nanotube sheet before supercritical water processing.
Figure 14B:
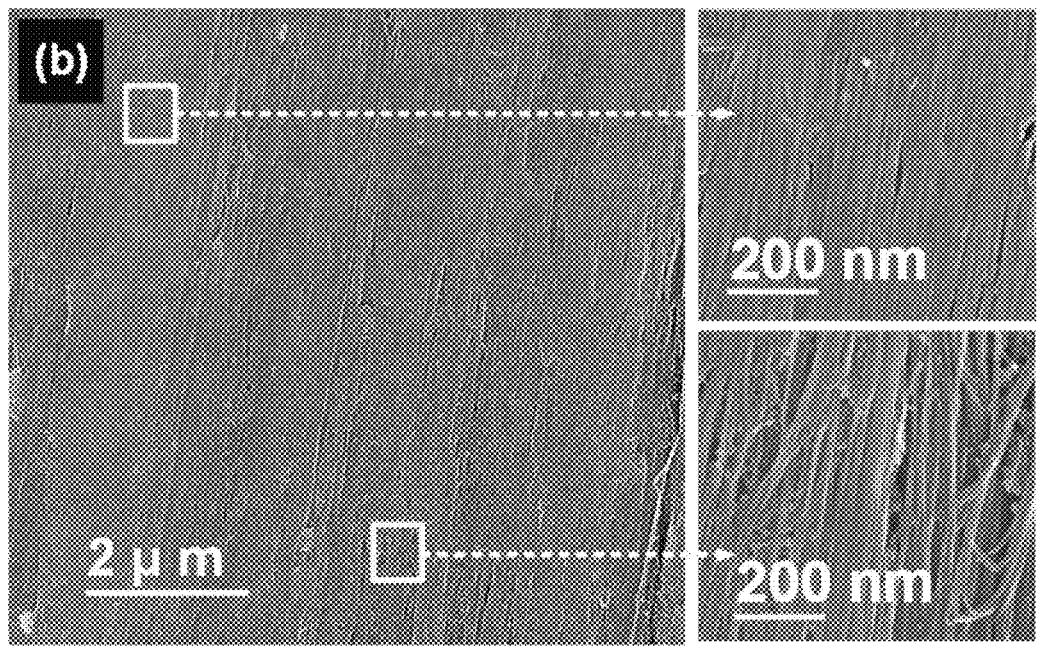
FIG. 14B shows the morphology of a carbon nanotube sheet after supercritical water processing.
Figure 15A:
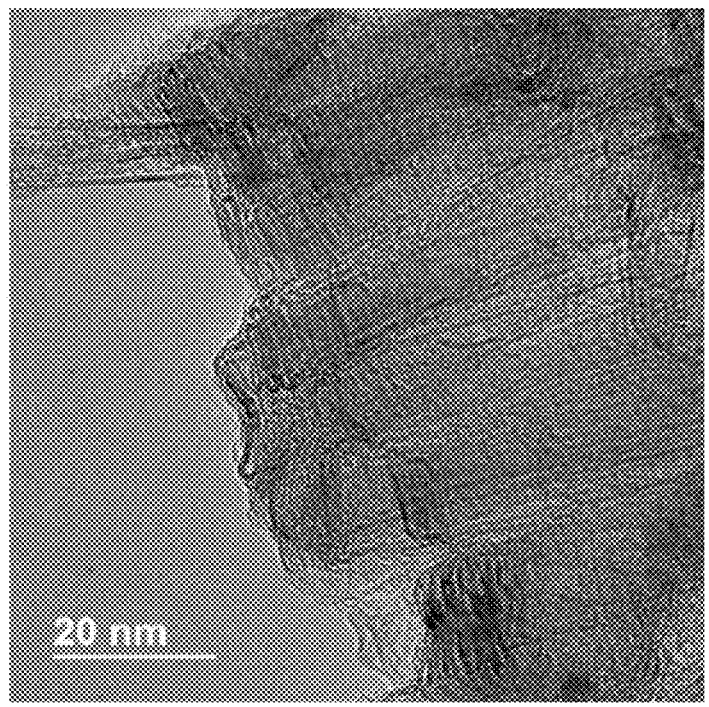
FIG. 15A shows a HR-TEM image of a flattened nanotubes stack to form large crystalline structure.
Figure 15B:
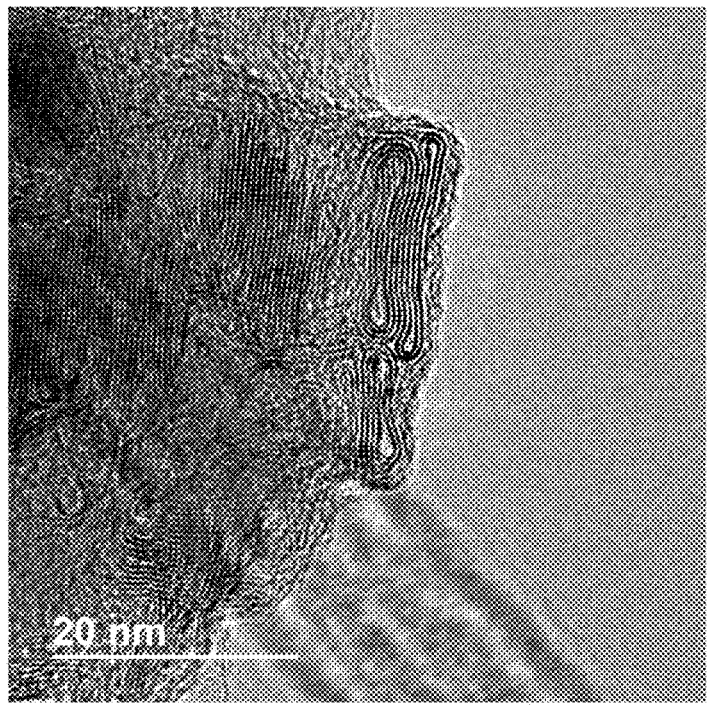
FIG. 15B shows a HR-TEM image of a flattened nanotubes stack to form large crystalline structure.

The superior alignment in large scale and dense packing of the CNTs in the sheets by the self-enforcing assembly was also observed. The morphology of CNT sheets was determined by scanning electron microscopy (SEM) and high-resolution transmission electron microscopy (HR-TEM). Plan-view SEM images of CNT sheets before (FIG. 14A) and after (FIG. 14B) super critical water processing. Before super critical water processing the stretched CNT sheets showed a typical oriented network of bundles that may branch, divide and rejoin around voids and catalyst particles (FIG. 14A). After super critical water processing (FIG. 14B), significant improvement in CNT alignment was observed over large length scale, where nanotubes appear to assemble parallel to each other and densely packed into large bundles with an improved packing order. Substantial amount of the nanotubes appear to have been flattened to pack even more densely. The tube collapsing, flattening and crystalline stacking is more clearly seen in the HR-TEM images (FIGS. 15A and 15B).

Figure 16:
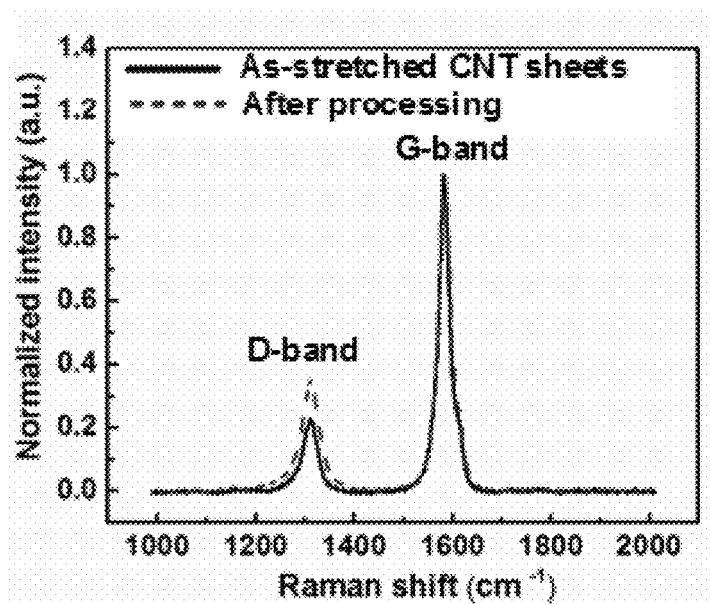
FIG. 16 is a graph of representative Raman spectra taken at polarization angles θ=0° for different carbon nanotube sheets.

Raman spectroscopy was used to further determine the structure change of CNT sheets during this process. FIG. 16 shows the representative Raman spectra taken at angle θ=0°, relative to the VV polarization axis. A slight increase was observed (from 0.22 to 0.34) in the ratio of intensities of the D peak to G peak after super critical water processing. Comparing to other purification technology, the nanotubes only incurred very mild damage to the graphitic layers in CNT sheets, while gaining significant structural optimization (i.e., alignment, dense packing, and increased crystallinity).

Figure 17:
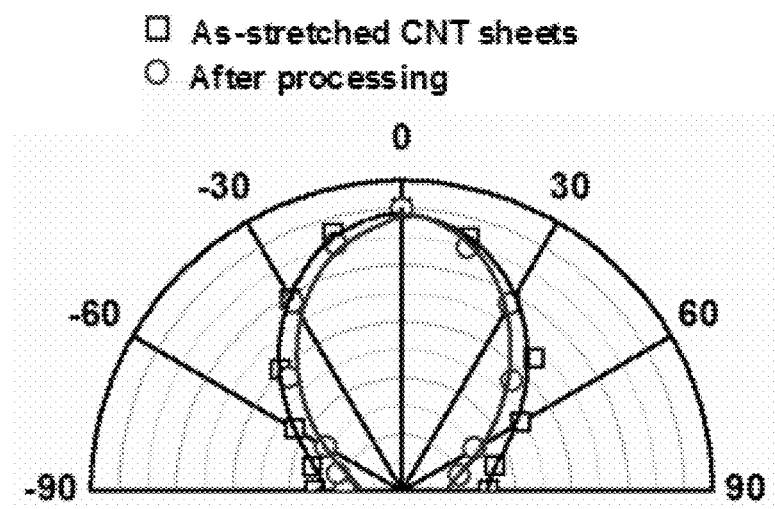
FIG. 17 is a graph of optical anisotropy in the graphic G-band the polar-diagram showing the G-band intensity with respect to θ for different carbon nanotube sheets.

The polar diagram in FIG. 17 outlines the normalized G-band intensity at different angles from −90° to 90°, at intervals of 30°. The shape of the intensity distribution indicates strong anisotropic Raman scattering. From the fitting curve, the degree of orientation of CNTs of super critical water treated CNT sheets was calculated to be 0.97 which is larger than that for stretched CNT sheets (0.85), again indicating significant improvement of alignment fraction in super critical water processed CNT sheets.

Figure 18A:
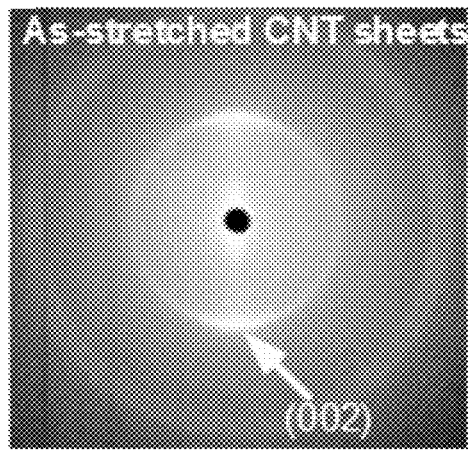
FIG. 18A shows wide angle X-ray diffraction of an as-stretched carbon nanotube sheet.
Figure 18B:
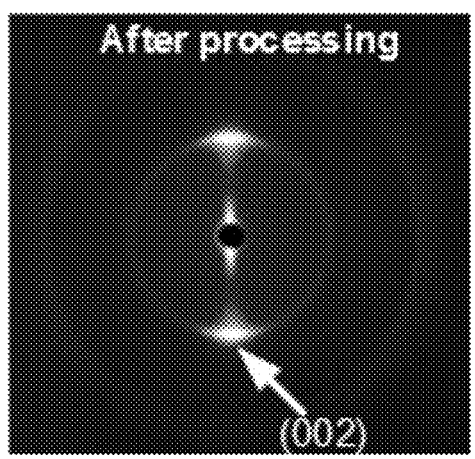
FIG. 18B shows wide angle X-ray diffraction of a stretched carbon nanotube sheet after supercritical water processing.
Figure 19:
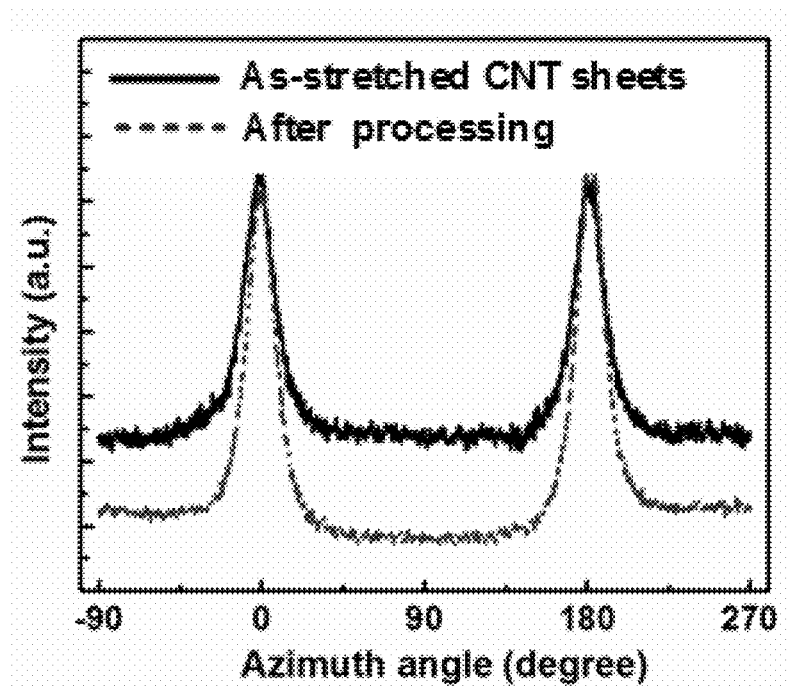
FIG. 19 is a graph of wide angle X-ray diffraction azimuthal intensity distribution for the (002) reflection of carbon nanotube sheets as-stretched and after supercritical water processing.

Wide angle X-ray diffraction (WAXD) experiments were also performed for different CNT sheets and two-dimensional X-ray diffraction (XRD) patterns were produced. FIGS. 18A and 18B show the two-dimensional X-ray diffraction (XRD) patterns of different CNT sheets. The anisotropy of the XRD patterns was caused by the anisotropic alignment of nanotubes in CNT sheets. The arc-shaped (002) reflection becomes considerably stronger and narrower after SCW treatment. FIG. 19 shows the azimuthal intensity profiles of this peak at the high angles of 20°<2θ<30°. The clear decrease of the full width at half maximum (FWHM) reveals the enhanced orientation degree in SCW treated samples. The degree of alignment in CNT sheets was calculated according to Hermans' method from the azimuthal scattering intensity distribution, which was 0.79 for stretched CNT sheets and 0.91 for SCW treated CNT sheets, somewhat lower than the results derived from the Raman test. Nevertheless both Raman and diffraction analysis unequivocally suggested a highly oriented CNT assembly of high crystallinity, in excellent agreement with SEM and TEM observations.

Figure 20A:
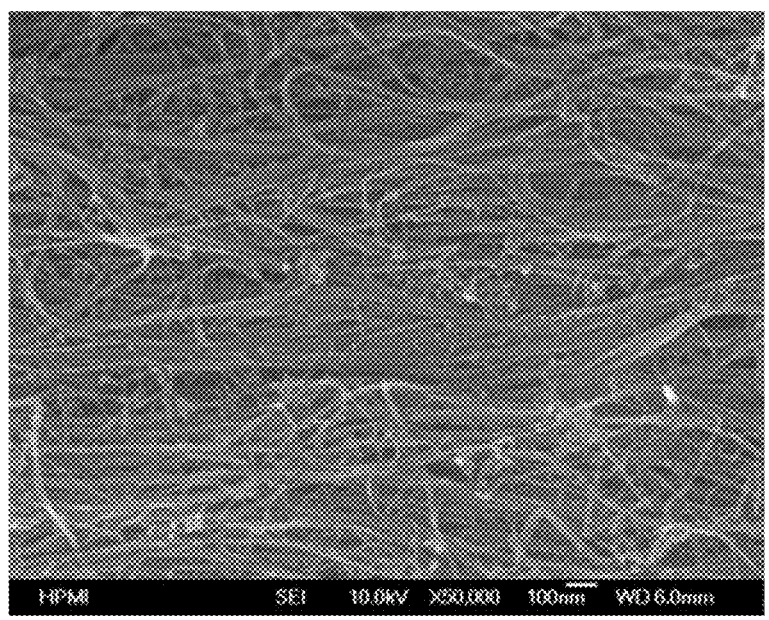
FIG. 20A is an SEM image of an as-stretched carbon nanotube sheet after high temperature treatment by heating up to 1600° C. at a rate of 20° C./min, then lowering the temperature (20° C./min) to and maintaining at 1400° C. for 1 hour.
Figure 20B:
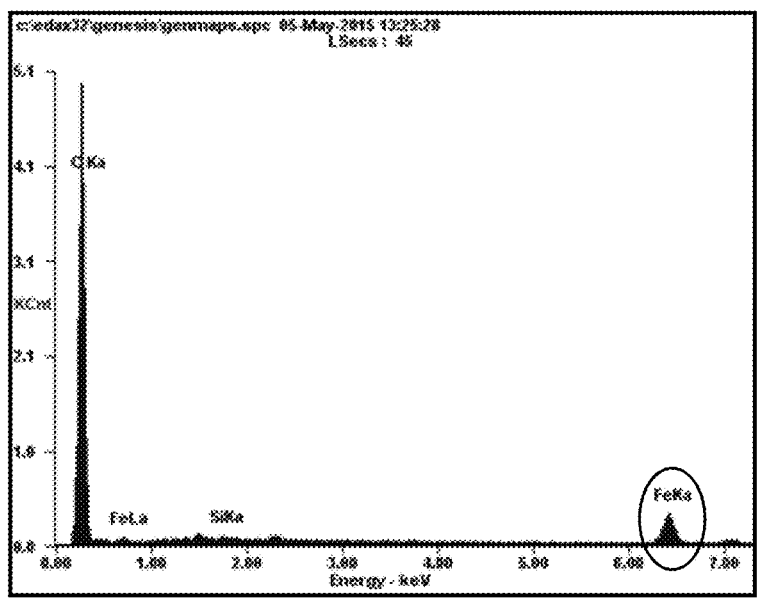
FIG. 20B is a graph of an EDS spectrum of the carbon nanotube sheet of FIG. 20A. A noticeable amount of iron is still detected after the high temperature treatment.
Figure 21A:
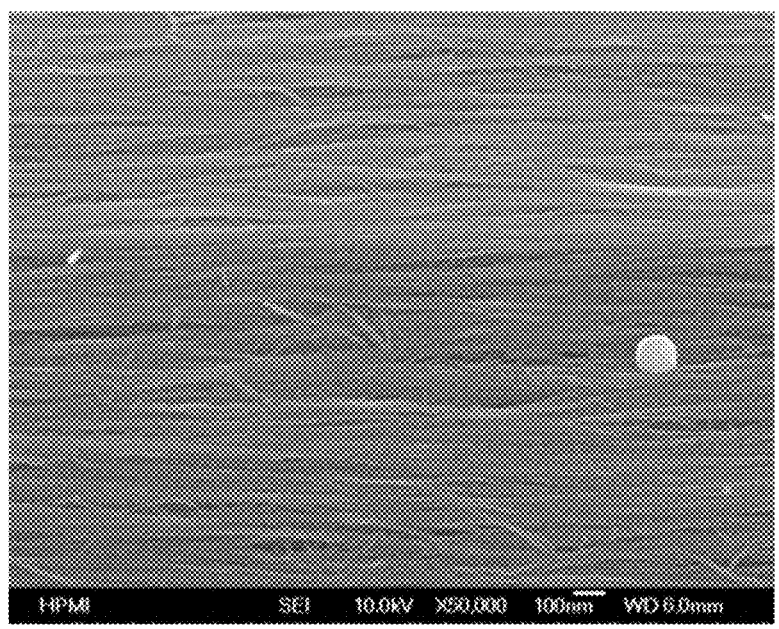
FIG. 21A is an SEM image of a supercritical water processed stretched carbon nanotube sheet after high temperature treatment by heating up to 1600° C. at a rate of 20° C./min, then lowering the temperature (20° C./min) to and maintaining at 1400° C. for 1 hour. The structures were significantly more dense and better aligned than those in FIG. 20A.
Figure 21B:
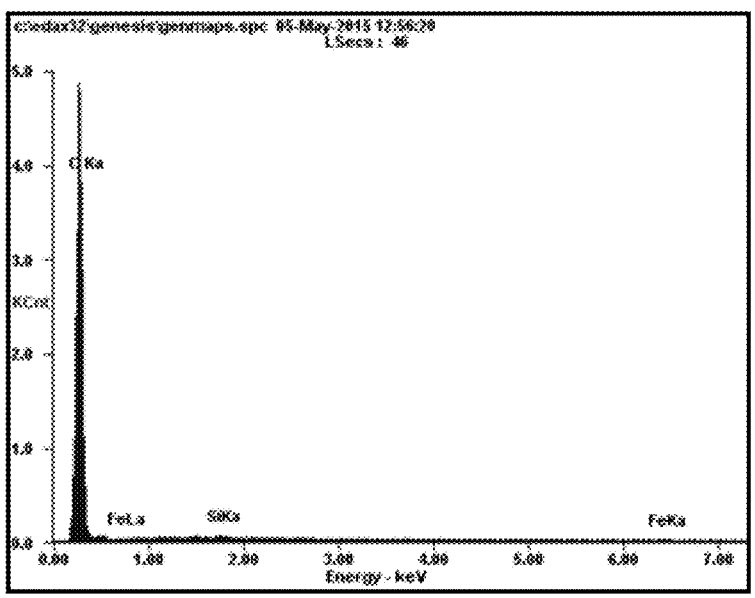
FIG. 21B is a graph of an EDS spectrum of the carbon nanotube sheet of FIG. 21A. The iron signal is almost completely absent.

High temperature (HT) treatment is another way commonly used to remove the catalyst, and at the same time, re-graphitize the defect regions in the nanotubes. Thus both as-stretched (before super critical water processing) and after super critical water processed CNTs sheets were heat treated by heating up to 1600° C. at a rate of 20° C./min, then the temperature was lowered (20° C./min) to 1400° C. and maintained there for 1 hour. The results are shown in FIGS. 20A and 20B (before super critical water processing) and FIGS. 21A and 21B (after super critical water processing). The super critical water processed CNT sheets shows significantly better alignment and denser packing, and is essentially catalyst free.

Figure 22:
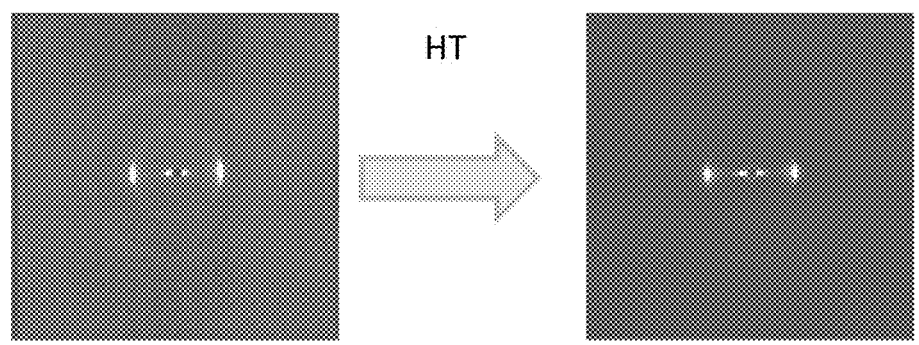
FIG. 22 shows a WAXS of a supercritical water processed carbon nanotube sheet before and after high temperature treatment.
Figure 23:
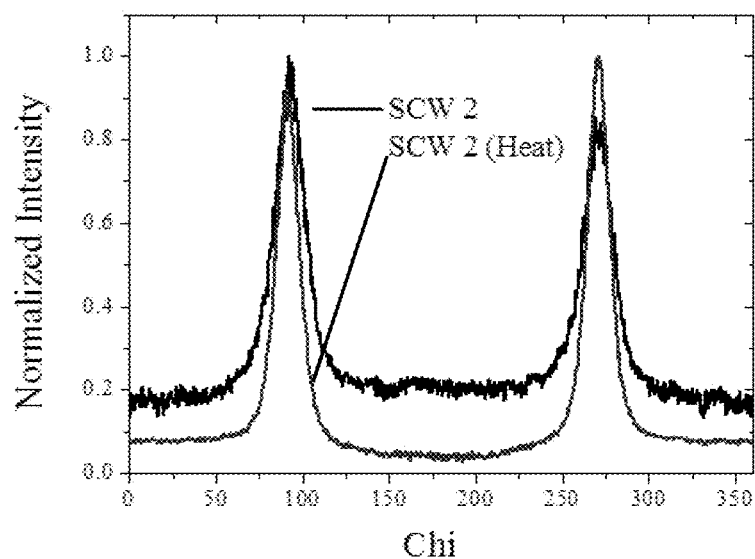
FIG. 23 is a graph of normalized intensity integrated around 2θ=26° for the supercritical water processed sheet before and after HT treatment.

The structure of super critical water processed CNT sheets before and after HT treatment was analyzed by wide-angle X-ray scattering (WAXS) and the result are shown in FIG. 22. Much stronger scattering patterns at azimuthal angle at 90° and 270° are observed for the HT treated sheet, suggesting a considerable improvement in the CNT alignment. A 2θ peak around 26 degree is related to the graphitic structure of carbon. Integration of the scattering pattern around this peak (FIG. 23) shows reduced FWHM after heat treatment, suggesting increased graphitic structures after heat treatment. Both SEM, EDS, and WAXS confirms that the HT treatment of super critical water processed CNT sheet resulted in a CNT assembly with even better nanotube alignment, packing and increased crystallinity. Without super critical water processing however, the HT treatment is not as beneficial in terms of improving the structure of the CNT sheet.

Figure 24:
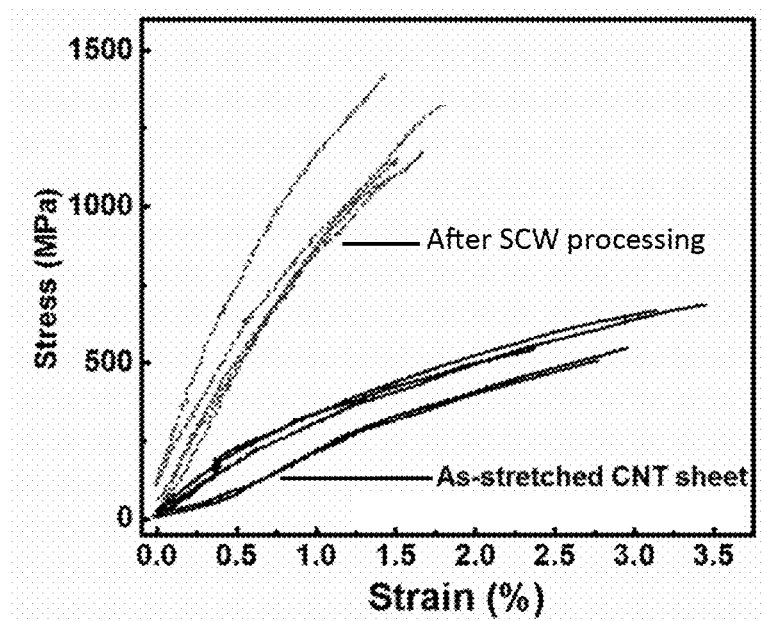
FIG. 24 illustrates stress-strain curves of carbon nanotube sheets before and after processing.
Figure 25:
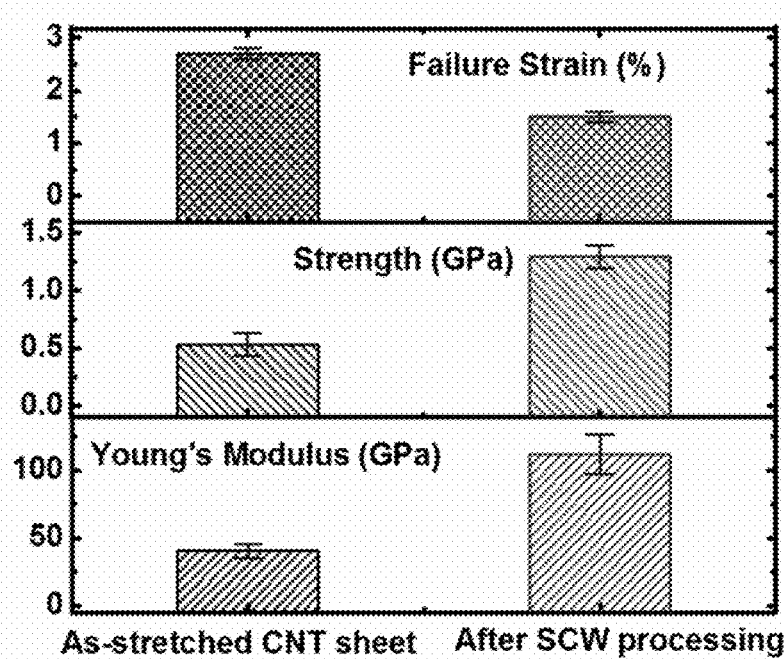
FIG. 25 illustrates mechanical properties of carbon nanotube sheets before and after processing.

Next, the mechanical properties of the CNT sheets were studied. FIG. 24 shows stress-strain curves for the as-stretched and post-processed CNT sheets. FIG. 25 summarizes the derived mechanical properties (Young's modulus, tensile strength and failure strain) of different CNT sheets. A significant improvement in strength from 0.53±0.1 to 1.29±0.1 GPa and modulus from 40±5 to 111±15 GPa w was achieved for CNT sheets after super critical water processing and the resulting structural improvement.

EXPERIMENTAL

Materials and Fabrication

The randomly oriented MWCNT sheets were purchased from Nanocomp Technologies Inc. (Concord, N.H., USA). The diameter of CNTs in these sheets was 3-8 nm and 1-2 mm long. Hydrochloric acid and hydrogen peroxide were purchased from Sigma-Aldrich (USA).

A mechanical uniaxial stretching process was applied to as-received CNT sheets to improve the degree of alignment of the CNT sheets at a rate of 0.5 mm/min until a 70% strain was achieved. Then, a piece of stretched CNT sheets (1 cm×7 cm) was loaded into a tube reactor made of SS316 stainless-steel (Parker Autoclave Engineers, USA). Distilled water (2.7 ml) used typically contained 0.5 mol/dm$^3$ of $H_2O_2$. The air inside the reactor was carefully purged by nitrogen. After the reactor was sealed with a cap, the reactor was immerged in a preheated fluidized-sand bath (Techne SB S-4 with TC-9D control, Bibby Scientific, USA). The internal temperature of the reactor reached the set value of 380° C. within about 5 minutes, during which time the pressure inside the reactor increased to reach 24 MPa. After 30 min, the reactor was placed in an ice bath for cooling. The CNT sheet was removed from the reactor, soaked in 20 ml of 6M hydrochloric acid for 1 h and washed with deionized water until pH=7. Then, the resultant CNT sheet was held between the tensile stages of Shimadzu (AGS-J, Shimadzu Scientific Inc.) at 60 N of force for 1 h. Finally, the CNT sheets were dried in flowing nitrogen at 400° C. for 30 min to remove adsorbed water. High temperature sample treatment was performed using a Simultaneous TGA-DSC from Netzsche (STA 449 F1 Jupiter®, Germany).

Characterization

Tensile tests were conducted using Shimadzu AGS-J tensile machine, equipped with a video extensometer system (DVE-20) at the temperature of 23° C. Specimens of 35 mm length and 2 mm width and 20 µm thickness were tested at a cross-head speed of 0.5 mm/min. The gauge length was kept as 20 mm. At least five specimens were tested for each type of CNT sheet samples. Young's modulus, tensile strength and failure strain were recorded.

The morphology of the samples was investigated using the SEM (JEOL 7401F), AFM in tapping mode (MultiMode II, Veeco Instruments Inc.) and TEM equipped with cold-cathode field-emission gun (JEOL ARM-200cF-2010). The samples for the TEM were prepared by ultrasonic dispersion in deionized water, placed on a copper TEM grid. The TGA was tested on TA 100 by heating from 30° C. to 900° C. in air at 10° C./min. The Raman spectroscopic characterization was performed on a Raman microscope (inVia microscope, Renishaw) using a 785 nm excitation at a laser power of 0.5 mW with a 50× objective lens. The laser beam size was around 10 µm in diameter. Polarized Raman spectra were obtained at many angles (θ) between the preferred axis and VV polarization vector to characterize the degree of alignment in CNT sheets, according to the following 2D model function which neglected the anisotropic optical penetration depth:

$$I(\theta, A_R, \sigma) \propto \int_0^{\frac{\pi}{2}} \left[ \frac{1-A_R}{\pi} + \frac{f}{\delta\sqrt{\pi/2}} e^{-2(\varphi-\theta)^2/\sigma^2} \right] \frac{\cos^4\varphi}{\cos\varphi + B\sin\varphi} d\varphi \quad \text{Eq. 1}$$

where I is the Raman G band peak intensity, a is the Gaussian standard deviation and AR is the aligned fraction which is equal to 1 for perfect alignment and 0 for complete random orientations.

WAXS measurements were obtained using a Bruker NanoSTAR system, operating at 45 kV and 650 mA with 1 µs microfocus X-ray source (the wavelength of Cu Kα, λ, =0.154 nm). The WAXS pattern was recorded by a Fuji Photo Film image plate, and the plate was read with a Fuji FLA-7000 scanner. The distance between the image plate and the sample stage was 50 mm and the X-ray beam size at the sample position was 150 µm in diameter. In the WAXS measurement, a 3600 s exposure time was used for collecting the WAXS scattering patterns for samples. The degree of alignment in the CNT sheets was derived from Herman's orientation factor (f) denoted by:

$$f = \frac{[3\langle\cos^2\chi\rangle - 1]}{2} \quad \text{Eq. 2}$$

$$\langle\cos^2\chi\rangle = \frac{\int_0^{\frac{\pi}{2}} I(\chi)\cos^2\chi\sin\chi d\chi}{\int_0^{\frac{\pi}{2}} I(\chi)\sin\chi d\chi} \quad \text{Eq. 3}$$

where I(χ) is the intensity at the azimuthal angle χ.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

GLOSSARY OF CLAIM TERMS

Impurity: Any residual catalysts, amorphous carbons, other carbon compounds (including fullerenes) or other undesired matter left from the nanotube synthesis.

Carbon nanotube: Allotropes of carbon with a cylindrical nanostructure.

Carbon nanotube material or structure: A collection of carbon nanotubes in powder, sheet, or other form.

Inorganic acid: A mineral acid derived from one or more inorganic compounds.

Non-limiting examples include hydrochloric acid, nitric acid, phosphoric acid, sulfuric acid, boric acid, hydrofluoric acid, hydrobromic acid, perchloric acid, hydroiodic acid, and mixtures thereof.

Oxidizer: a substance that has the ability to cause other substances to lose electrons. Non-limiting examples include oxygen, ozone, hydrogen peroxide and other inorganic peroxides, chlorine and other halogens, chlorite, hypochlorite, chlorate, perchlorate, hypohalite compounds, hexavalent chromium compounds, permanganate compounds, sodium perborate, nitrous oxide, potassium nitrate, and mixtures thereof.

What is claimed is:

1. A carbon nanotube structure, comprising:
a carbon nanotube buckypaper comprising a plurality of carbon nanotubes, wherein an impurity resulting from the formation of the plurality of carbon nanotubes has been removed from the carbon nanotube buckypaper and the plurality of carbon nanotubes have been substantially oriented by:
contacting the carbon nanotube buckypaper with a mixture of a processing fluid and an oxidizer under elevated temperature and pressure to expose the impurity;
lowering the temperature and pressure to ambient conditions;
contacting the exposed impurity to an acid to remove the impurity; and
subjecting the carbon nanotube buckypaper to a tensile force thereby orienting the plurality of carbon nanotubes primarily in a direction of the tensile force;
wherein the carbon nanotube buckypaper exhibits a modulus of about 111 GPa, a tensile strength of about 1.29 GPa.

2. The carbon nanotube structure of claim 1, further comprising subjecting the carbon nanotube buckypaper to a tensile force prior to contacting the carbon nanotube buckypaper with the mixture.

3. The carbon nanotube structure of claim 1, wherein the mixture comprises approximately 0.1-1.0 mol/dm$^3$ of the oxidizer.

4. The carbon nanotube structure of claim 1, wherein the processing fluid comprises water.

5. The carbon nanotube structure of claim 1, wherein the processing fluid further comprises oxygen, ozone, hydrogen peroxide and other inorganic peroxides, chlorine and other halogens, chlorite, hypochlorite, chlorate, perchlorate, hypohalite compounds, hexavalent chromium compounds, permanganate compounds, sodium perborate, nitrous oxide, potassium nitrate, and mixtures thereof.

6. The carbon nanotube structure of claim 1, wherein the acid is an inorganic acid.

7. The carbon nanotube buckypaper of claim 1, wherein the carbon nanotube buckypaper exhibits a density of 1.8 g/cc.

* * * * *